US012795656B2

(12) United States Patent
Huang et al.

(10) Patent No.: US 12,795,656 B2
(45) Date of Patent: Nov. 10, 2026

(54) UPLINK CONTROL INFORMATION (UCI) MULTIPLEXING ON PHYSICAL UPLINK SHARED CHANNEL (PUSCH) WITH A FALLBACK DOWNLINK CONTROL INFORMATION (DCI)

(71) Applicant: QUALCOMM Incorporated, San Diego, CA (US)

(72) Inventors: Yi Huang, San Diego, CA (US); Jing Sun, San Diego, CA (US); Mostafa Khoshnevisan, San Diego, CA (US); Jing Jiang, San Diego, CA (US); Ahmed Abdelaziz Ibrahim Abdelaziz Zewail, San Diego, CA (US)

( * ) Notice: Subject to any disclaimer, the term of this patent is extended or adjusted under 35 U.S.C. 154(b) by 343 days.

(21) Appl. No.: 18/437,890

(22) Filed: Feb. 9, 2024

(65) Prior Publication Data

US 2025/0261189 A1 Aug. 14, 2025

(51) Int. Cl.

| | |
|---|---|
| ***H04W 72/1268*** | (2023.01) |
| ***H04W 72/21*** | (2023.01) |
| ***H04W 72/232*** | (2023.01) |
| ***H04W 72/566*** | (2023.01) |

(52) U.S. Cl.

CPC ....... *H04W 72/1268* (2013.01); *H04W 72/21* (2023.01); *H04W 72/232* (2023.01); *H04W 72/566* (2023.01)

(58) Field of Classification Search

CPC ............. H04W 72/1268; H04W 72/21; H04W 72/232; H04W 72/566

See application file for complete search history.

(56) References Cited

U.S. PATENT DOCUMENTS

| | | | | |
|---|---|---|---|---|
| 2019/0223205 | A1 | 7/2019 | Papasakellariou | |
| 2021/0329660 | A1* | 10/2021 | Zhang | H04W 72/0453 |
| 2022/0167404 | A1* | 5/2022 | Park | H04W 16/14 |
| 2023/0262712 | A1* | 8/2023 | Park | H04L 1/08 370/336 |
| 2023/0284212 | A1* | 9/2023 | Ibrahim | H04L 1/08 370/329 |
| 2024/0073923 | A1* | 2/2024 | Lim | H04B 7/0404 |
| 2024/0179705 | A1* | 5/2024 | Lim | H04B 7/024 |
| 2024/0389110 | A1* | 11/2024 | Park | H04L 1/1864 |
| 2025/0080284 | A1* | 3/2025 | Lei | H04L 1/1896 |
| 2025/0142576 | A1* | 5/2025 | Shim | H04L 5/0096 |

OTHER PUBLICATIONS

International Search Report and Written Opinion—PCT/US2025/010674—ISA/EPO—Mar. 19, 2025.

* cited by examiner

*Primary Examiner* — Kent Krueger

(57) ABSTRACT

Certain aspects of the present disclosure provide a method for wireless communications at a user equipment (UE). The UE may receive a first downlink control information (DCI) of a first type scheduling one or more first physical uplink shared channels (PUSCHs) and a second DCI of a second type scheduling one or more second PUSCHs. The UE may process at least one of the one or more first PUSCHs scheduled by the first DCI or the one or more second PUSCHs scheduled by the second DCI. The processing of the one or more first PUSCHs may include multiplexing at least one uplink control information (UCI) on a PUSCH of the one or more first PUSCHs and transmitting the PUSCH of the one or more first PUSCHs.

26 Claims, 19 Drawing Sheets

UPLINK CONTROL INFORMATION (UCI) MULTIPLEXING ON PHYSICAL UPLINK SHARED CHANNEL (PUSCH) WITH A FALLBACK DOWNLINK CONTROL INFORMATION (DCI)

BACKGROUND

Field of the Disclosure

Aspects of the present disclosure relate to wireless communications, and more particularly, to techniques for managing multiplexing of uplink control information (UCI) on a physical uplink shared channel (PUSCH).

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes receiving at least one of a first downlink control information (DCI) of a first type scheduling one or more first physical uplink shared channels (PUSCHs) or a second DCI of a second type scheduling one or more second PUSCHs; and processing at least one of the one or more first PUSCHs scheduled by the first DCI or the one or more second PUSCHs scheduled by the second DCI, wherein the processing of the one or more first PUSCHs comprises multiplexing at least one uplink control information (UCI) on a PUSCH of the one or more first PUSCHs and transmitting the PUSCH of the one or more first PUSCHs.

Another aspect provides a method for wireless communications at a network entity. The method includes transmitting at least one of a first downlink control information (DCI) of a first type scheduling one or more first physical uplink shared channels (PUSCHs) or a second DCI of a second type scheduling one or more second PUSCHs; and receiving at least one of: one or more processed first PUSCHs scheduled by the first DCI or one or more processed second PUSCHs scheduled by the second DCI, wherein the one or more processed first PUSCHs comprises at least one uplink control information (UCI) multiplexed on a PUSCH of the one or more first PUSCHs.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
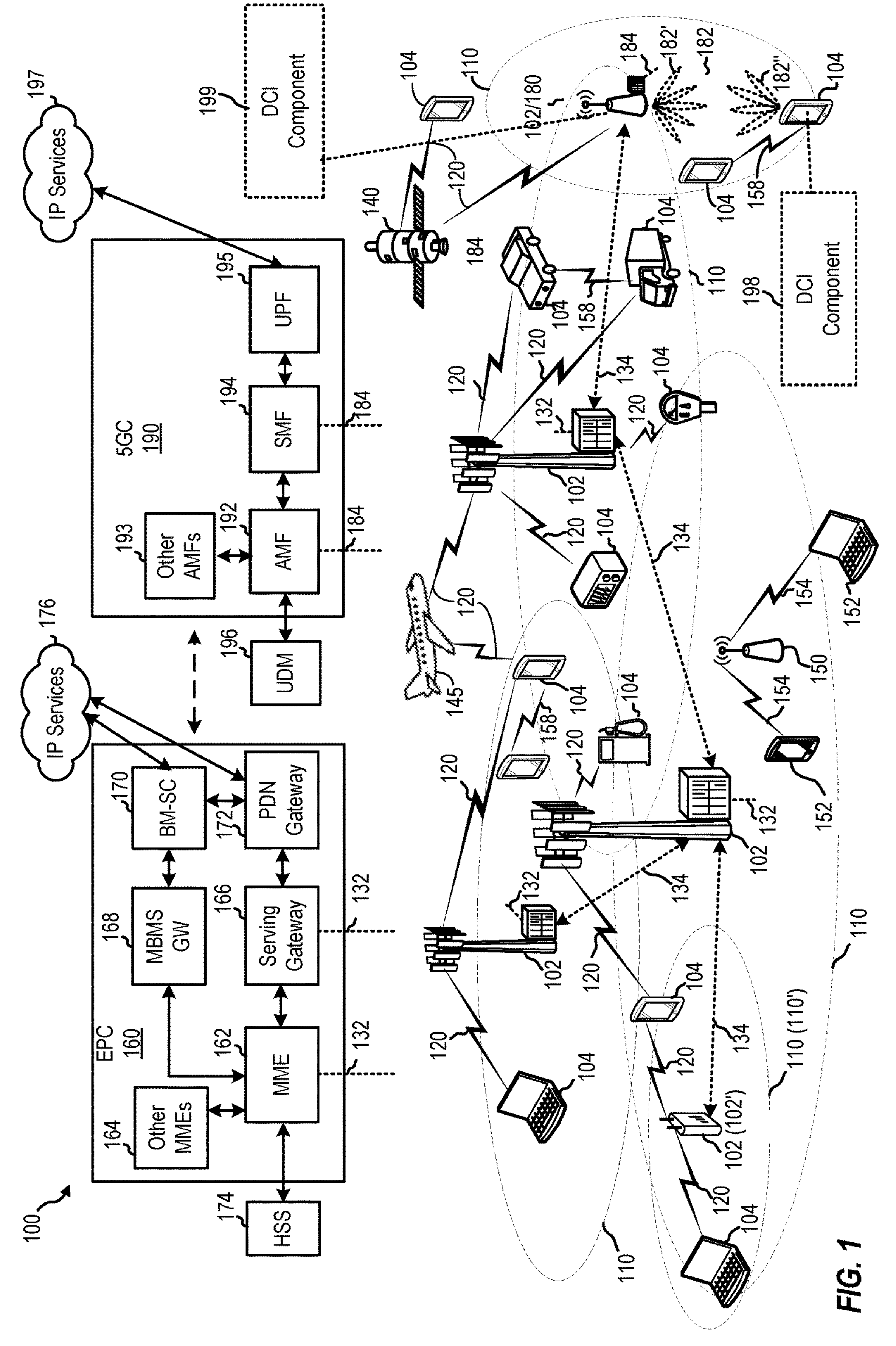
FIG. 1 depicts an example wireless communications network.

Aspects of the present disclosure provide apparatuses, methods, processing systems, and computer-readable mediums for managing multiplexing of uplink control information (UCI) on a physical uplink shared channel (PUSCH).

In a wireless communication system, a user equipment (UE) multiplexes communications on different physical channels. For example, the UE may multiplex a physical uplink control channel (PUCCH) communication (e.g., that includes UCI, such as hybrid automatic repeat request (HARQ) acknowledgment/negative acknowledgement (ACK/NACK) feedback, channel state information (CSI) report) and a PUSCH communication.

A gNodeB (gNB) may use a downlink control information (DCI) (e.g., a non-fallback DCI with DCI format 1_1, DCI format 0_1) to schedule the PUSCH. In some cases, the gNB may add one bit in the non-fallback DCI to indicate whether multiplexing of the UCI on the PUSCH is enabled or not. For example, when the non-fallback DCI includes a bit indicating that multiplexing is enabled, the UE multiplexes the UCI on the PUSCH.

In some cases, the gNB may use another DCI (e.g., a fallback DCI with DCI format 0_0, DCI format 1_0) for scheduling uplink transmissions. However, for the PUSCH scheduled by the fallback DCI, such a bit in the fallback DCI may not exist. In such cases, the UE may not know whether or how to perform multiplexing of the UCI on the PUSCH scheduled by the fallback DCI.

When the UE may receive one or more DCIs of different types (e.g., the non-fallback DCI, the fallback DCI) scheduling multiple PUSCHs, techniques described herein may enable the UE to implement a multi-step procedure to process the PUSCHs. In Step 0, the UE may process first PUSCHs scheduled by the non-fallback DCI. For example, when the non-fallback DCI scheduling the first PUSCHs indicates that multiplexing is enabled, the UE multiplexes UCI on at least one first PUSCH. In Step 1, the UE may process second PUSCHs scheduled by the fallback DCI. For example, the UE applies one or more rules that may be defined for cases when the UCI overlaps with at least one second PUSCH scheduled by the fallback DCI. In Step 2: the UE may determine whether there is still any UCI overlap with any other scheduled PUSCH. If there is the overlap, the UE may drop the UCI.

Particular aspects of the subject matter described in this disclosure can be implemented to realize one or more of the following potential advantages. In some examples, the described techniques may conserve network resources due to fewer transmissions, potentially reduce interference due to the fewer transmissions, and may also reduce latency by avoiding transmission delays.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
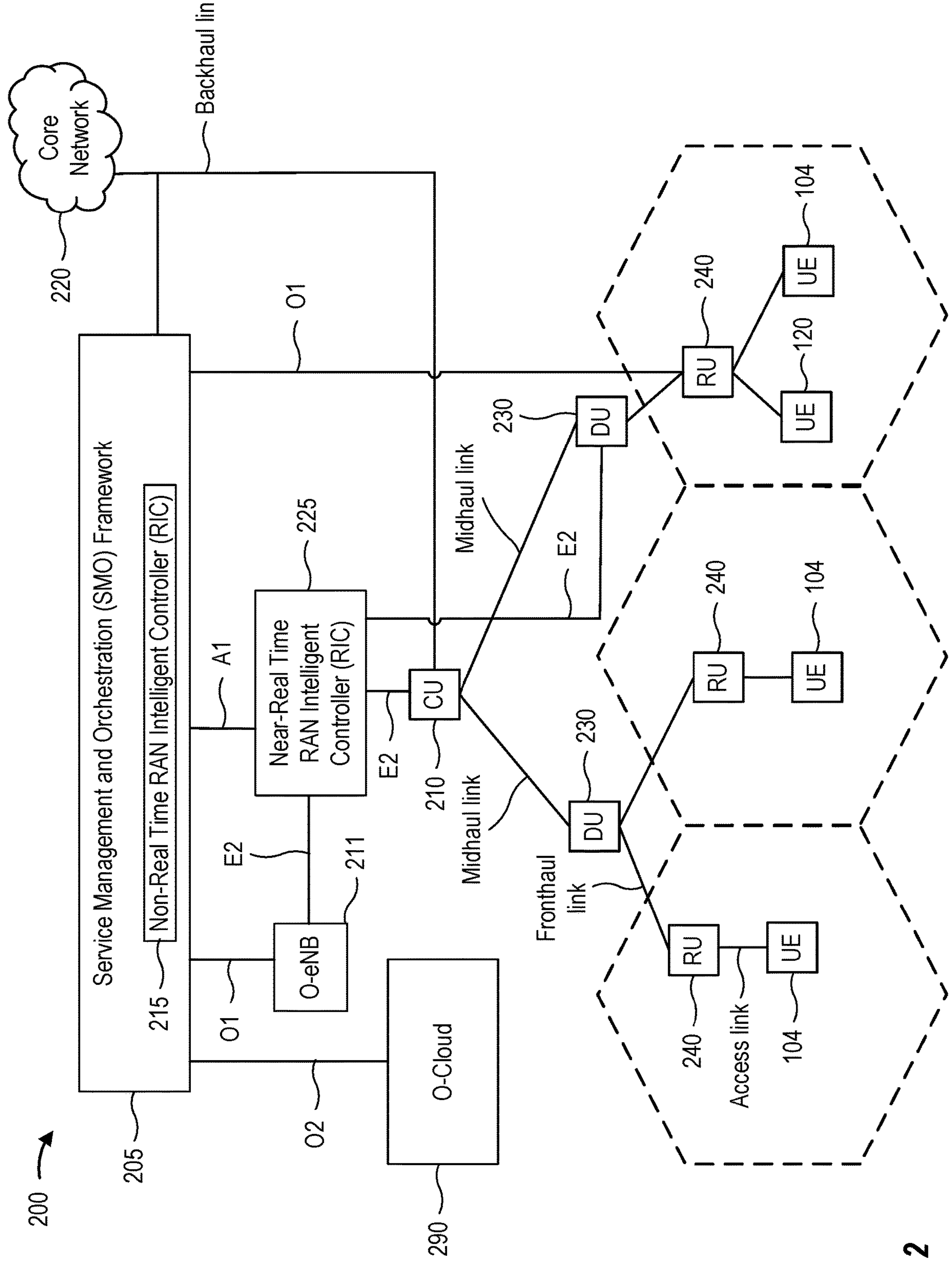
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (Dus), one or more radio units (Rus), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5 GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHZ-6 GHz, which is often referred to (interchangeably) as “Sub-6 GHz”. Similarly, 3GPP currently defines Frequency Range 2 (FR2) as including 26-41 GHz, which is sometimes referred to (interchangeably) as a “millimeter wave” (“mmW” or “mm Wave”). A BS configured to communicate using mm Wave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5 GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 16:
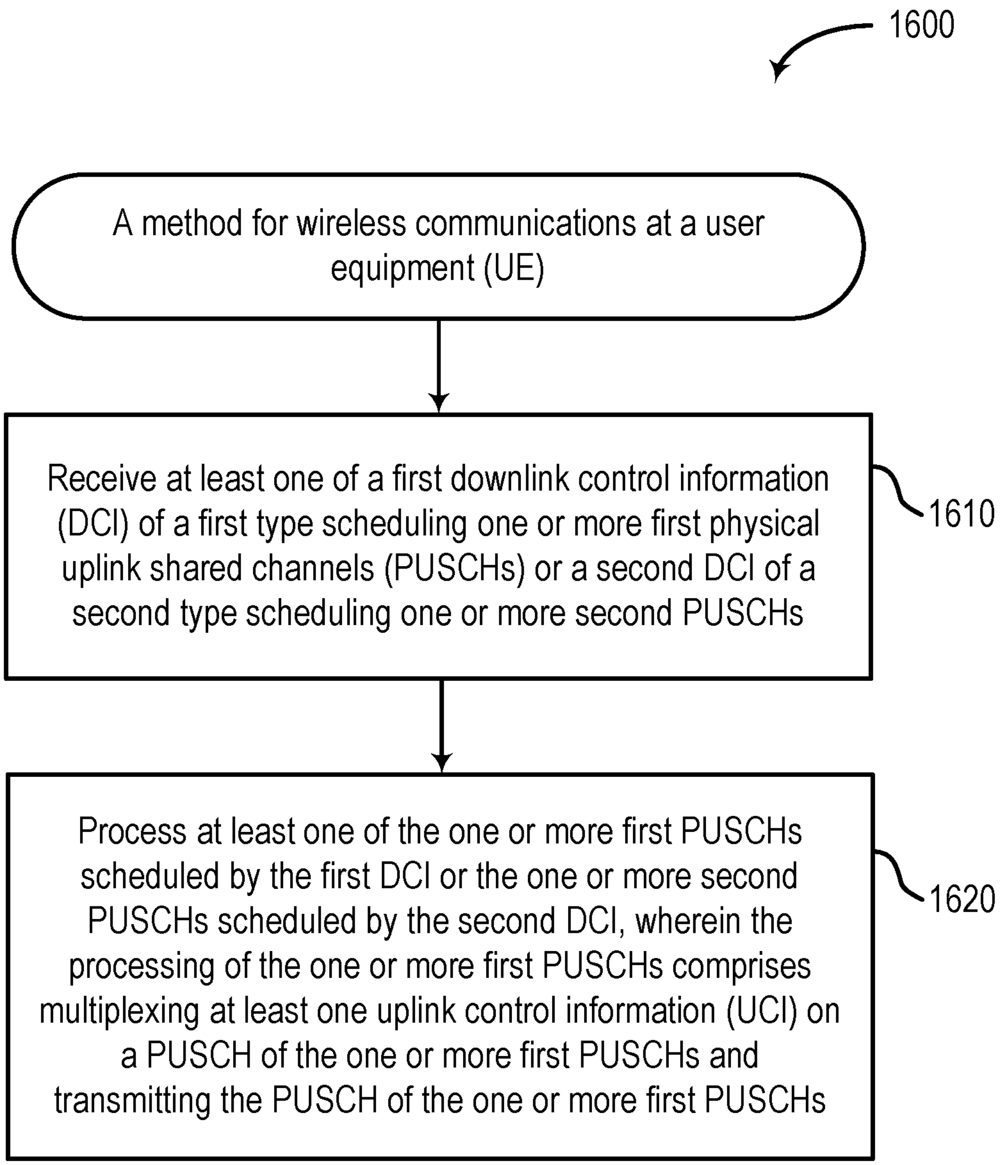
FIG. 16 depicts a method for wireless communications at a UE.

Wireless communication network 100 further includes downlink control information (DCI) component 198, which may be configured to perform method 1600 of FIG. 16. Wireless communication network 100 further includes DCI component 199, which may be configured to perform method 1700 of FIG. 17.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (Cus) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (Dus) 230 via respective midhaul links, such as an F1 interface. The Dus 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
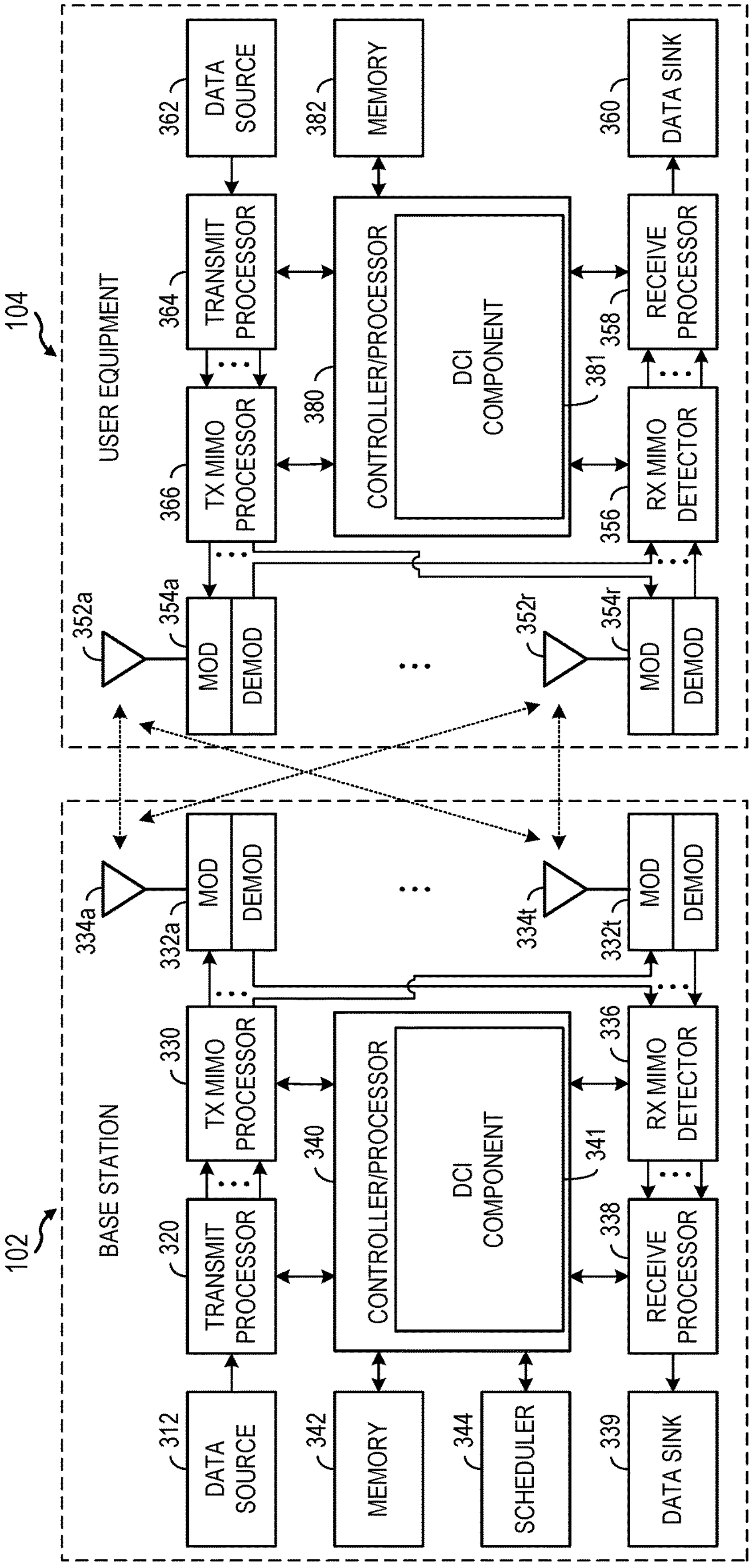
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes DCI component 341, which may be representative of DCI component 199 of FIG. 1. Notably, while depicted as an aspect of controller/processor 340, DCI component 341 may be implemented additionally or alternatively in various other aspects of BS 102 in other implementations.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes DCI component 381, which may be representative of DCI component 198 of FIG. 1. Notably, while depicted as an aspect of controller/processor 380, DCI component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the SRS). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs 104 for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna

334*a-t*, and/or other aspects described herein. Similarly, “receiving” may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, “transmitting” may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, “receiving” may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIG. 4A, FIG. 4B, FIG. 4C, and FIG. 4D depict aspects of data structures for a wireless communications network, such as wireless communications network 100 of FIG. 1.

Figure 4B:
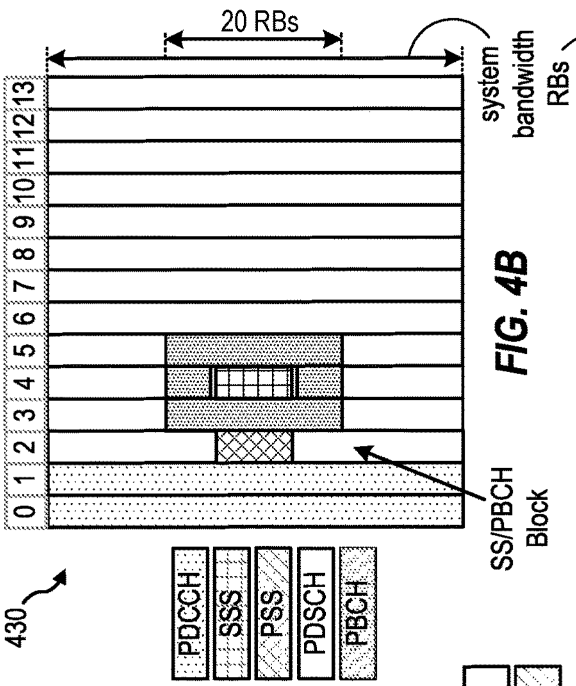
FIG. 4A, FIG. 4B, FIG. 4C, and FIG. 4D depict various example aspects of data structures for a wireless communications network.
Figure 4A:
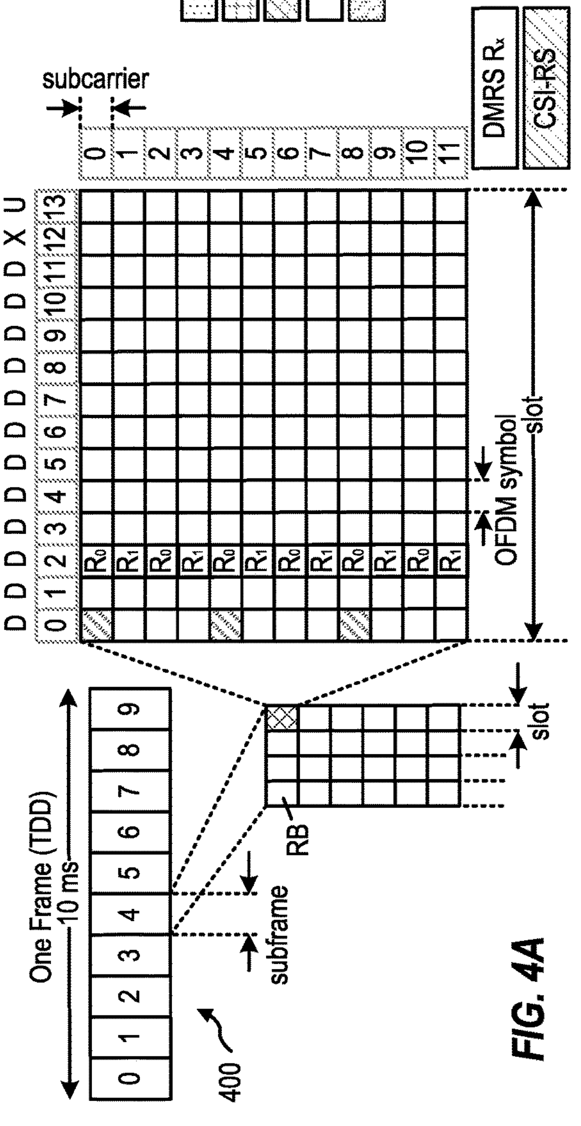
Figure 4D:
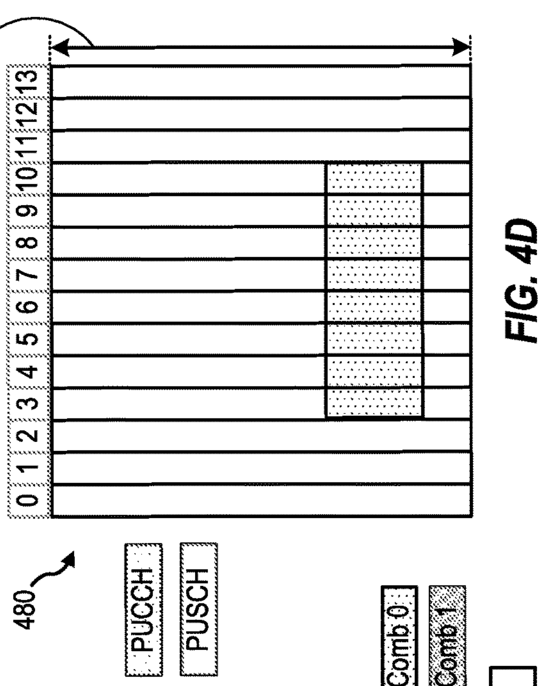
Figure 4C:
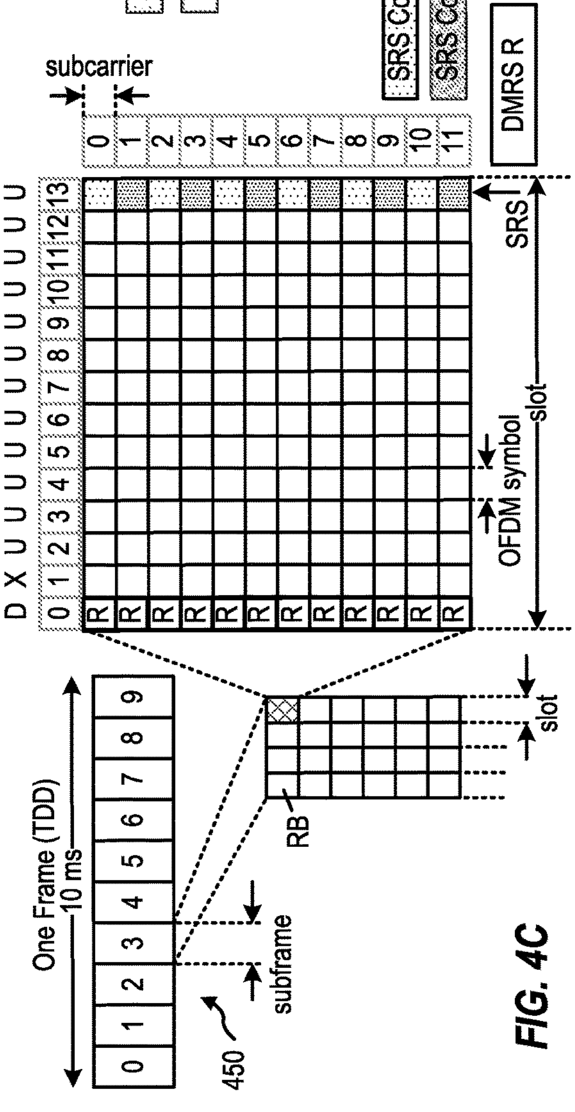

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIG. 4B and FIG. 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be TDD, in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs 104 may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 2μ slots/subframe. The subcarrier spacing and symbol length/duration are a function of the numerology. The subcarrier spacing may be equal to 24× 15 kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIG. 4A, FIG. 4B, FIG. 4C, and FIG. 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIG. 4A, FIG. 4B, FIG. 4C, and FIG. 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIG. 1 and FIG. 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIG. 1 and FIG. 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Mm Wave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5th generation (5G) networks may utilize several frequency ranges, which in some cases are defined by a standard, such as 3rd generation partnership project (3GPP) standards. For example, 3GPP technical standard TS 38.101 currently defines Frequency Range 1 (FR1) as including 600 MHZ-6 GHZ, though specific uplink and downlink allocations may fall outside of this general range. Thus, FR1 is often referred to (interchangeably) as a “Sub-6 GHz” band.

Similarly, TS 38.101 currently defines Frequency Range 2 (FR2) as including 26-41 GHz, though again specific uplink and downlink allocations may fall outside of this general range. FR2, is sometimes referred to (interchangeably) as a “millimeter wave” (“mmW” or “mmWave”) band, despite being different from the extremely high frequency (EHF) band (30 GHz-300 GHz) that is identified by the International Telecommunications Union (ITU) as a “millimeter wave” band because wavelengths at these frequencies are between 1 millimeter and 10 millimeters.

Communications using mm Wave/near mm Wave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Example Uplink Control Information

A physical uplink control channel (PUCCH) is an uplink physical channel that carries uplink control information (UCI). As downlink control information (DCI) is carried by a physical downlink control channel (PDCCH), the UCI is carried by the PUCCH. One difference between the DCI and the UCI is that the UCI may be carried either by the PUCCH or a physical uplink shared channel (PUSCH) depending on situation, whereas the DCI may only be carried by the PDCCH (and not by a physical downlink shared channel (PDSCH) in any case).

The UCE may carry content or elements such as hybrid automatic repeat request (HARQ) positive acknowledgement (ACK), HARQ negative acknowledgement (NACK), scheduling request (SR), and/or channel state information (CSI) report. Not all of the elements may be carried by a single UCI. Depending on situation, sometimes only CSI is carried by the single UCI, sometimes only ACK/NACK is carried by the single UCI, sometimes only SR is carried by the single UCI, and sometimes CSI and ACK/NACK is carried by the single UCI.

The elements may be combined in various ways and reported to a gNodeB (gNB) via the uplink physical channel such as the PUCCH or the PUSCH. The possible combinations of the elements may be i) HARQ ACK/NACK only, ii) SR only, iii) HARQ ACK/NACK+SR, iv) CSI only, v) CSI+SR, vi) HARQ ACK/NACK+CSI, and vii) HARQ ACK/NACK+SR+CSI.

The HARQ ACK/NACK or CSI or SR is sent on defined periods via the PUCCH as the UCI. However, in some cases, UCI information may have to be sent before a scheduled period. In such cases, a user equipment (UE) may utilize a time-frequency instance of an already-scheduled PUSCH to send the UCI to the gNB. The PUSCH may be scheduled using DCI formats 0_0 or 0_1. However, there are some limitations to sending the UCI via the PUSCH. For example, only the UCI that do not have the SR may be sent via the PUSCH. UCI combinations such HARQ ACKNACK only, CSI only, or CSI+HARQ ACKNACK may be sent via the PUSCH.

Example Multiplexing of Transmissions

In a wireless communication system, a user equipment (UE) may multiplex communications on different physical channels. For example, the UE may multiplex a physical uplink control channel (PUCCH) communication (e.g., that includes uplink control information (UCI), such as hybrid automatic repeat request (HARQ) acknowledgment or negative acknowledgement (ACK/NACK) feedback, channel state information (CSI) report and/or the like) and a physical uplink shared channel (PUSCH) communication.

The UE may multiplex the PUCCH and the PUSCH by piggybacking the PUCCH in the PUSCH, which may include puncturing (e.g., dropping) one or more bits of the PUSCH and replacing the punctured PUSCH bit(s) with bit(s) of the PUCCH and/or which may include rate-matching one or more bits of the PUSCH around UCI bits of the PUCCH. Such multiplexing may conserve network resources due to fewer transmissions, may reduce latency by avoiding transmission delays, and/or the like.

Figure 5:
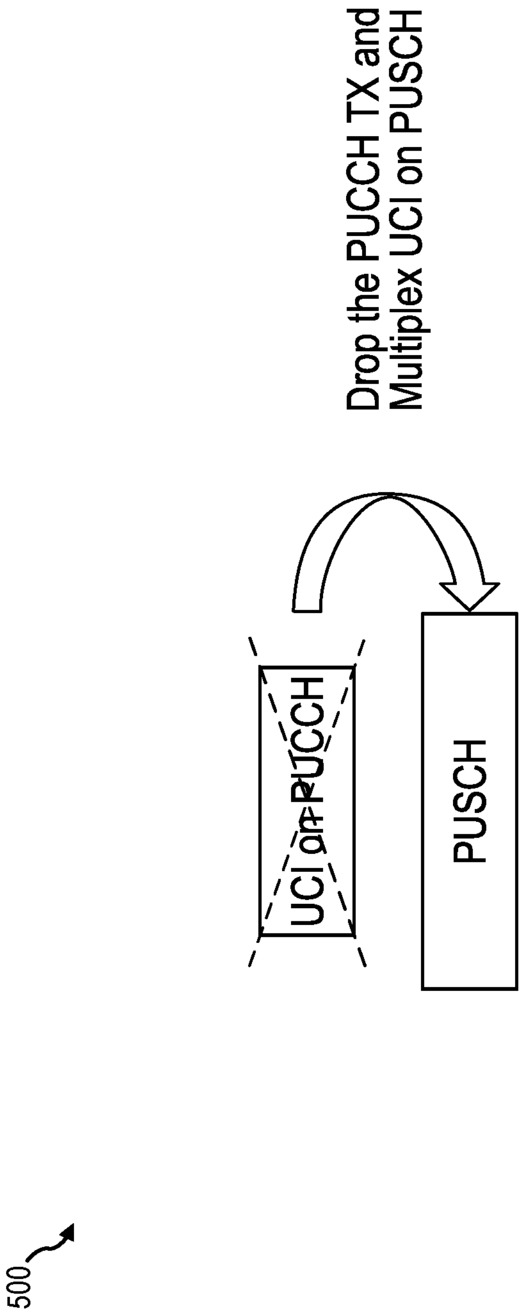
FIG. 5 depicts example uplink control information (UCI) multiplexing on a physical uplink shared channel (PUSCH).

The UE may multiplex the UCI (e.g., which may be carried by the PUCCH) and the PUSCH for several reasons. For example, the PUCCH and the PUSCH may be scheduled on a same component carrier (CC). In such cases, a parallel PUCCH/PUSCH transmission on the same CC may increase intermodulation distortion & out of band emission, which may force the UE to reduce transmission power. This may result in a reduced uplink coverage for the UE. To avoid the reduced uplink coverage, as illustrated in a diagram 500 of FIG. 5, the UE may drop the PUCCH and multiplex the UCI on the PUSCH.

Figure 6:
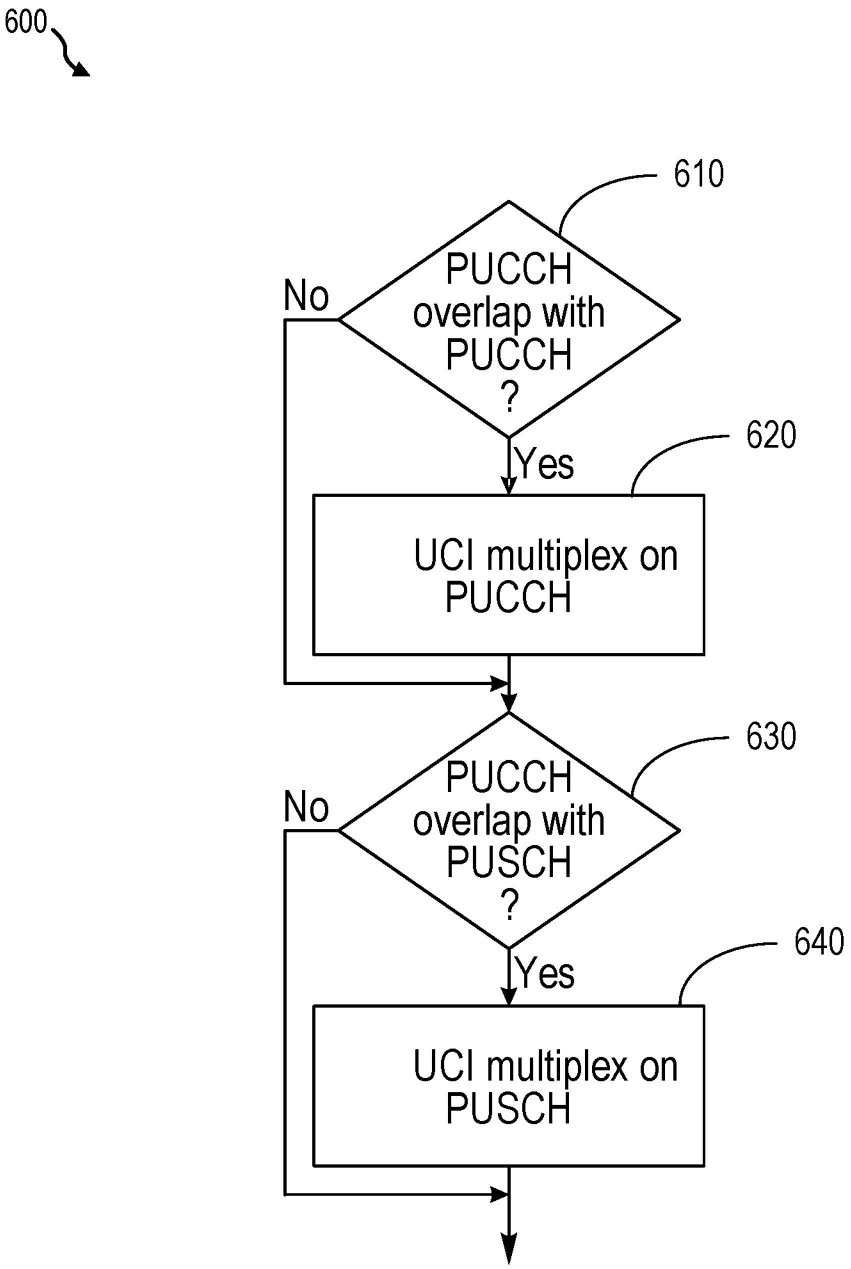
FIG. 6 depicts example process for UCI multiplexing on a PUSCH.

In some cases, the UE may perform a deep, vertical, and complicated sequential procedure to determine whether and how the UE need to perform the multiplexing. The procedure may be triggered by overlapping of PUCCHs in a time domain. For example, as illustrated in a diagram 600 of FIG. 6, the UE (at 610) may determine whether there is an overlap between the PUCCHs in the time domain. When the UE may determine that there is the overlap between the PUCCHs in the time domain, the UE may run a (iterative) pseudo code to determine a final PUCCH (e.g., from the overlapped PUCCHs) for multiplexing UCIs (e.g., which may have been carried by the overlapped PUCCHs). The UE (at 620) may multiplex the UCIs on the determined final PUCCH. The UE (at 630) may determine whether there is an overlap between one or more PUCCHs (e.g., including the determined final PUCCH) and one or more PUSCHs in a time domain. When the UE may determine that there is the overlap between the PUCCHs and the PUSCHs in the time domain, the UE may run (or implement) a set of rules to prioritize all the PUSCHs (e.g., assign a priority number to each PUSCH). The UE may then select a PUSCH with a highest priority (e.g., among all the PSUCHs) as a final PUSCH for multiplexing the UCIs. The UE (at 640) may multiplex the UCIs on the determined final PUSCH. The UE transmits the determined final PUSCH to a gNodeB (gNB).

Figure 7:
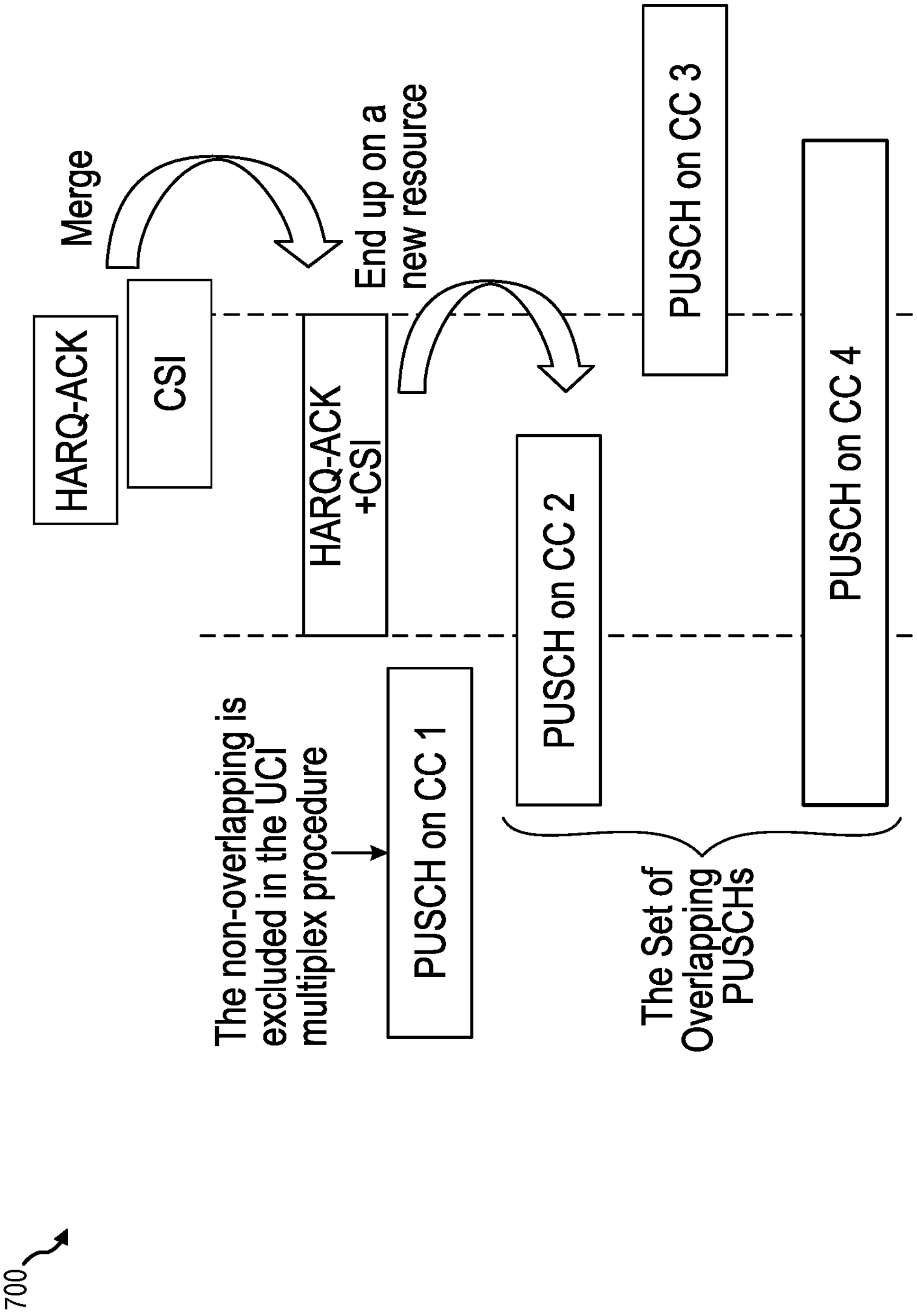
FIG. 7 depicts example scheduling of carrier PUSCHs across multiple component carries (CCs).

In some cases, multiple PUSCHs (e.g., candidate PUSCHs) may be scheduled on multiple CCs. For example, as illustrated in a diagram 700 of FIG. 7, the multiple PUSCHs may be scheduled on the multiple CCs such as a first CC (CC1), a second CC (CC2), a third CC (CC3), and a fourth CC (CC4). The PUSCHs scheduled on some CCs (such as the second CC, the third CC, and the fourth CC) may overlap in a time domain. In such cases, there may an ambiguity on which PUSCH (e.g., among all the PUSCHs) may be used to carry merged UCIs including HARQ-ACK and CSI report (e.g., due to missing downlink control information (DCI) of downlink/uplink grant). For example, the ambiguity of a final PUCCH resource (e.g., due to missing downlink grants) may lead to the ambiguity on how to determine a final PUSCH from a set of candidate PUSCHs (e.g., to carry the merged UCIs). In some cases, the missing uplink grant may lead to the ambiguity on how to determine the final PUSCH from the set of candidate PUSCHs (e.g., to carry the merged UCIs). In such cases, the UE may apply (complicated) rules to determine the final PUSCH from the set of candidate PUSCHs to carry the merged UCIs.

Figure 8:
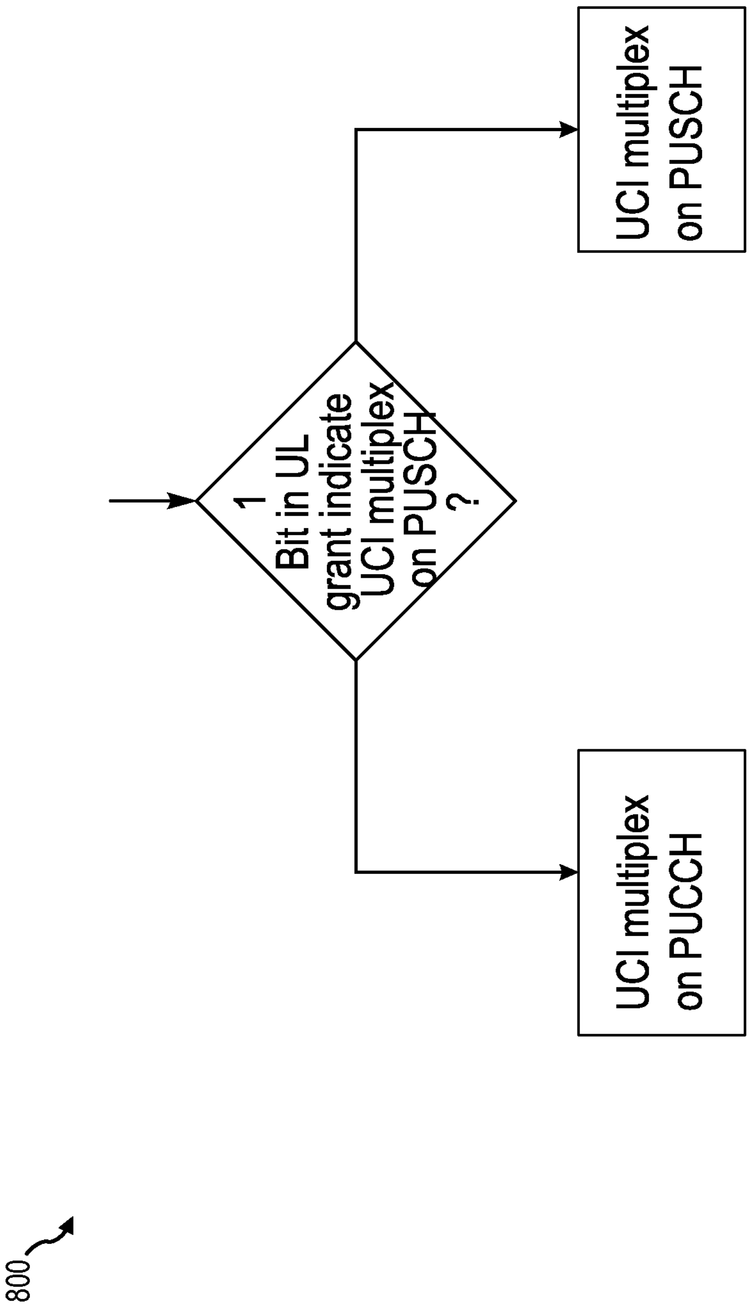
FIG. 8 depicts example bit in an uplink grant indicating whether UCI multiplexing on a PUSCH is enabled.

In some cases, the UE may implement a single step procedure (or a flat procedure) to determine whether to multiplex UCI on a PUCCH or a PUSCH. For example, as illustrated in a diagram 800 of FIG. 8, the UE may determine whether to multiplex the UCI on the PUCCH or the PUSCH, based on information associated with the uplink grant. For example, when the uplink grant may include at least one bit (e.g., to indicate that the UCI multiplexing on the PUSCH may be enabled), the UE may multiplex the UCI on the PUSCH. When the uplink grant may not include the at least one bit or the at least one bit may may not indicate that the UCI multiplexing on the PUSCH is enabled, the UE may multiplex the UCI on the PUCCH. In some cases, when the at least one bit may indicate a value of 1, the UE may multiplex the UCI on the PUSCH. Otherwise, the UE may not multiplex the UCI on the PUSCH.

Figure 9:
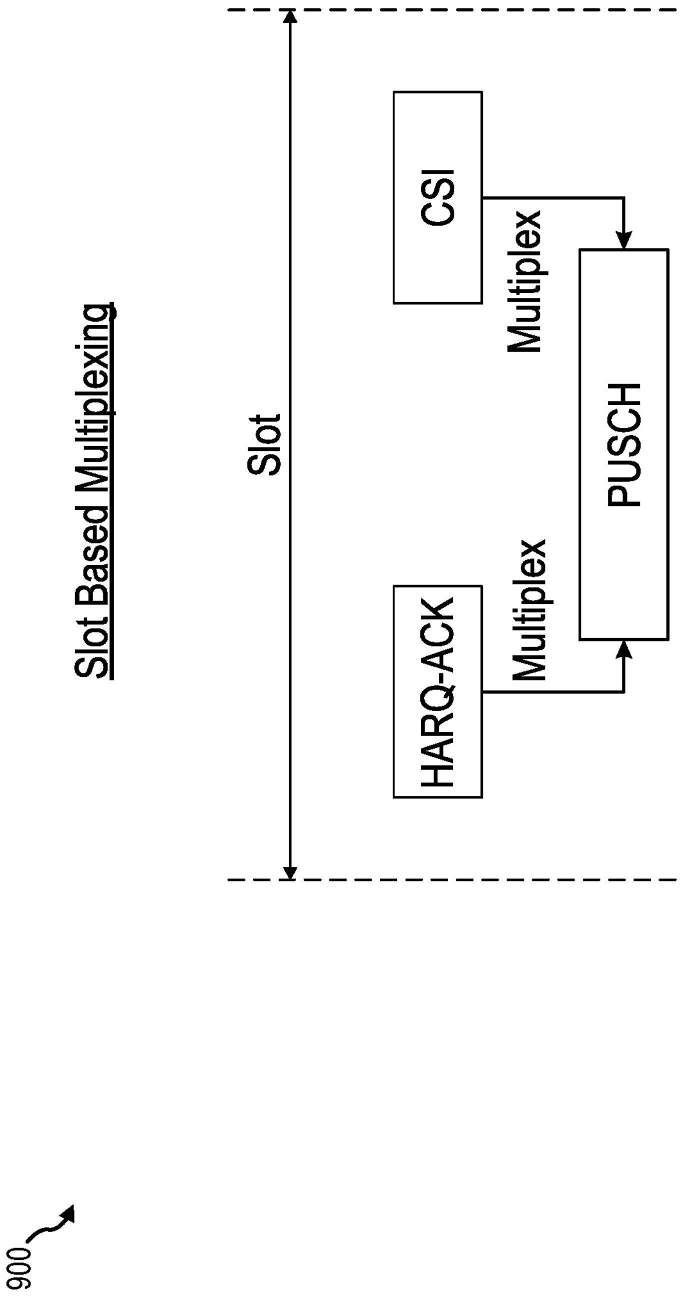
FIG. 9 depicts example slot-based multiplexing.

In some cases, the UE may perform a slot-based multiplexing. For example, as illustrated in a diagram 900 of FIG. 9, the UE may multiplex each UCI (e.g., HARQ-ACK, CSI report) scheduled in a same slot (e.g., a first slot) on a PUSCH scheduled in the same slot (e.g., the first slot). This multiplexing process may reduce an ambiguity due to a missing DCI, but in some cases there may be unnecessary multiplexing of UCIs (e.g., as all UCIs scheduled in the same slot are multiplexed).

Figure 10:
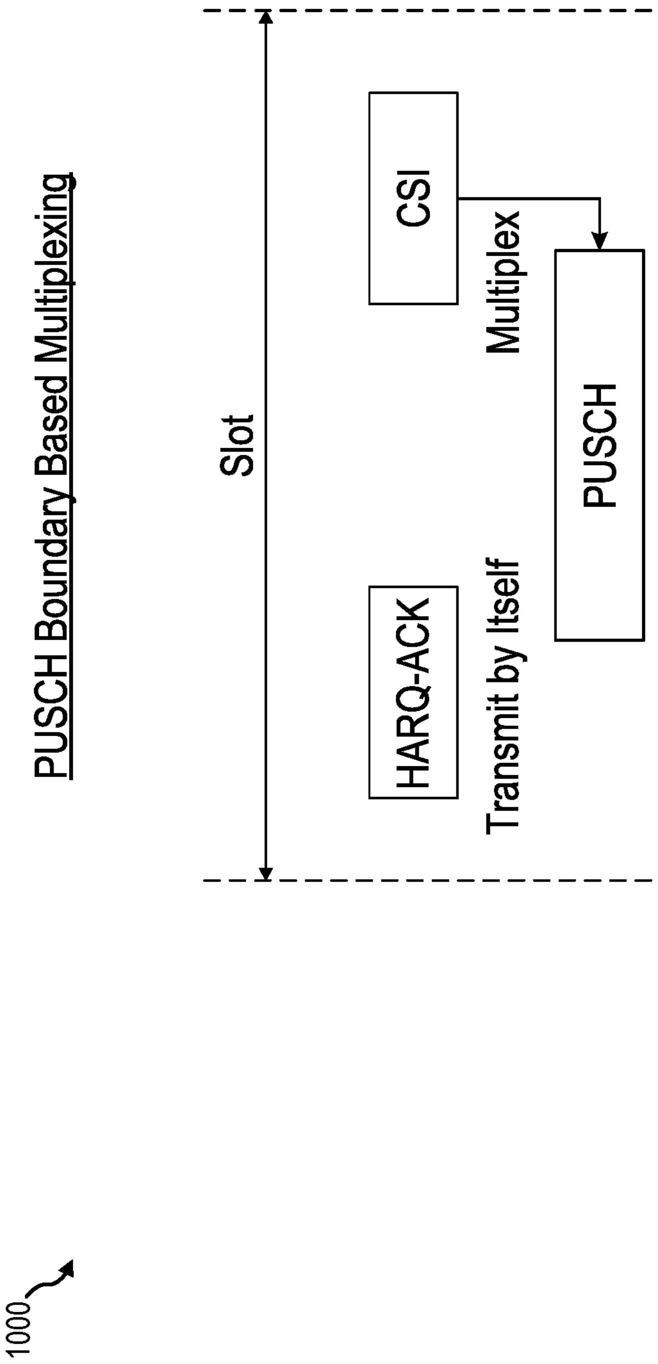
FIG. 10 depicts example PUSCH boundary-based multiplexing.

In some cases, the UE may perform a PUSCH boundary-based multiplexing. For example, as illustrated in a diagram 1000 of FIG. 10, the UE may only multiplex each UCI (e.g., CSI report) scheduled in a slot that is overlapping with a PUSCH in a time domain. The UE may transmit other UCI (e.g., such as HARQ-ACK) on its own. This multiplexing process may prevent unnecessary multiplexing of UCIs, but in some cases there may be some ambiguity due to missing downlink grant.

Aspects Related To UCI Multiplexing on A PUSCH With A Fallback DCI

Aspects of the present disclosure provide apparatuses, methods, processing systems, and computer-readable mediums for managing multiplexing of uplink control information (UCI) on a physical uplink shared channel (PUSCH).

For example, when a user equipment (UE) receives one or more downlink control informations (DCIs) of different types (e.g., a non-fallback DCI, a fallback DCI) scheduling multiple PUSCHs, techniques described herein may enable the UE to implement a multi-step procedure to process the PUSCHs. In Step 0, the UE may process first PUSCHs scheduled by the non-fallback DCI. For example, when the non-fallback DCI scheduling the first PUSCHs indicates that multiplexing is enabled, the UE multiplexes UCI on at least one first PUSCH. In Step 1, the UE may process second PUSCHs scheduled by the fallback DCI. For example, the UE applies one or more rules that may be defined for cases when the UCI overlaps with at least one second PUSCH scheduled by the fallback DCI. In Step 2: the UE may determine whether there is still any UCI overlap with any other scheduled PUSCH. If there is the overlap, the UE may drop the UCI.

Particular aspects of the subject matter described in this disclosure can be implemented to realize one or more of the following potential advantages. In some examples, the described techniques may conserve network resources due to fewer transmissions, potentially reduce interference due to the fewer transmissions, and may also reduce latency by avoiding transmission delays.

The techniques proposed herein for managing UCI multiplexing on a PUSCH may be understood with reference to FIG. 11-FIG. 19.

Figure 11:
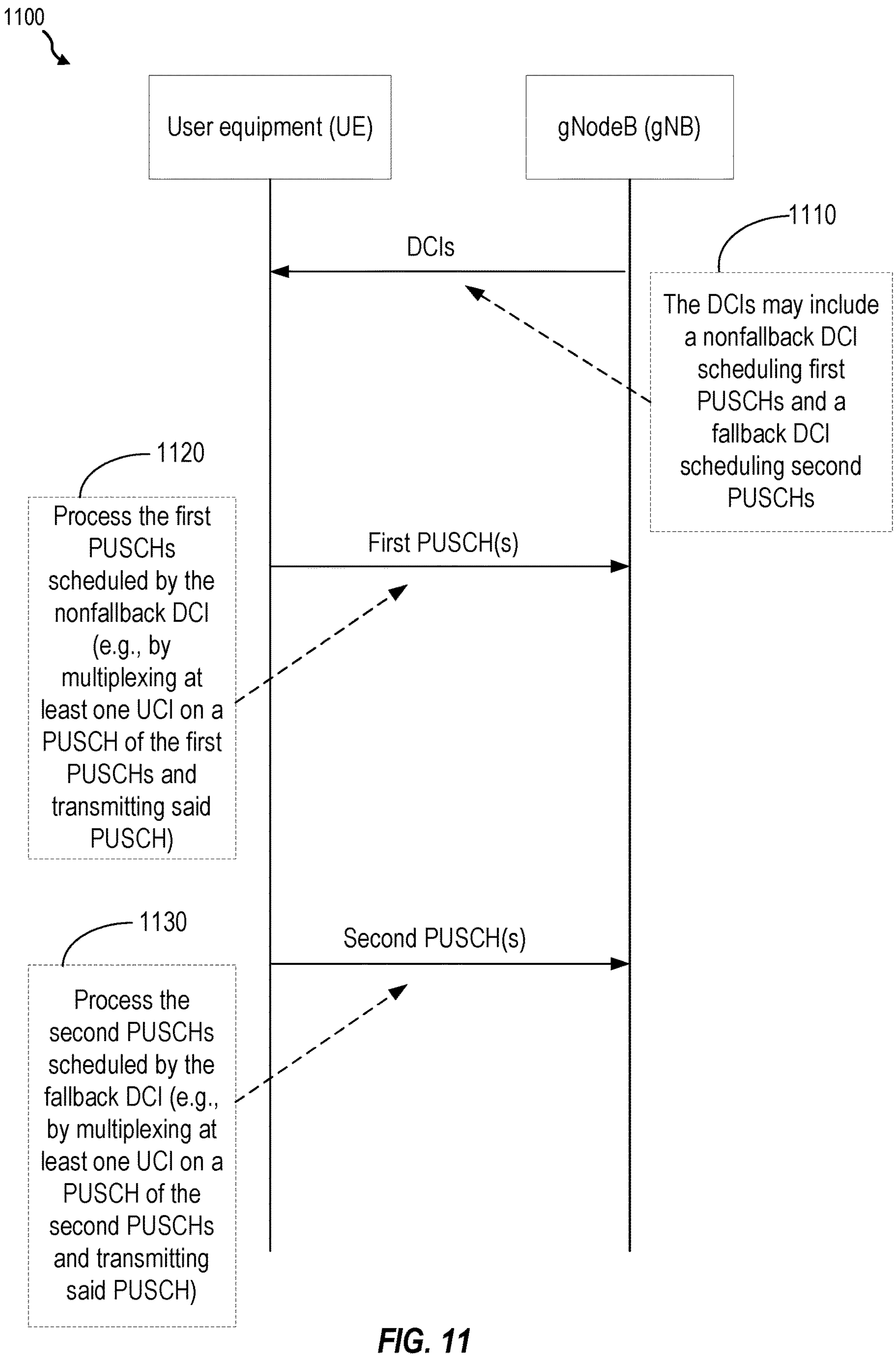
FIG. 11 depicts a call flow diagram illustrating example communication among a UE and a network entity.

FIG. 11 depicts a call flow diagram 1100 illustrating example communication among a UE and a network entity (e.g., a gNB) for managing UCI multiplexing on a PUSCH with a fallback DCI. The UE shown in FIG. 11 may be an example of the UE 104 depicted and described with respect to FIG. 1 and FIG. 3. The gNB depicted in FIG. 11 may be an example of the BS 102 depicted and described with respect to FIG. 1 and FIG. 3, or the disaggregated BS depicted and described with respect to FIG. 2.

As indicated at 1110, the gNB sends one or more DCIs to the UE.

In certain aspects, the one or more DCIs may include at least one first DCI of a first type scheduling one or more first PUSCHs. The first DCI of the first type may be a non-fallback DCI. The non-fallback DCI may be associated with a non-fallback DCI format (e.g., DCI format 1_1, DCI format 0_1). The non-fallback DCI of the DCI format 0_1 may be used for uplink resource allocation (e.g., scheduling grants) for a PUSCH. The non-fallback DCI of the DCI format 1_1 may be used for allocating downlink resources for a physical downlink shared channel (PDSCH).

In certain aspects, the one or more DCIs may include at least one second DCI of a second type scheduling one or more second PUSCHs. The second DCI of the second type may be a fallback DCI. The fallback DCI may be associated with a fallback DCI format (e.g., DCI format 0_0, DCI format 1_0). The fallback DCI of the DCI format 0_0 may be used for uplink resource allocation (e.g., scheduling grants) for a PUSCH. The fallback DCI of the DCI format 1_0 may be used for allocating downlink resources for a PDSCH.

In certain aspects, the non-fallback DCI may include at least one bit to indicate that multiplexing (e.g., slot-based multiplexing, PUSCH boundary-based multiplexing, etc.) of at least one UCI with the one or more first PUSCHs is enabled.

As indicated at 1120, the UE may process the one or more first PUSCHs scheduled by the non-fallback DCI prior to any other PUCSHs scheduled by any other DCI (e.g., the fallback DCI). For example, the UE may multiplex at least one UCI on at least one first PUSCH (e.g., of the one or more first PUSCHs), and then transmit the at least one first PUSCH to the gNB.

In certain aspects, when the non-fallback DCI may include the at least one bit to indicate that the slot-based multiplexing may be enabled, the UE may stop whole procedure (e.g., of processing the one or more first PUSCHs) and move to processing of the one or more second PUSCHs scheduled by the fallback DCI.

In certain aspects, when the non-fallback DCI may include the at least one bit to indicate that the PUSCH boundary-based multiplexing may be enabled, the UE may continue the whole procedure (e.g., of processing the one or more first PUSCHs) and then move to processing of the one or more second PUSCHs scheduled by the fallback DCI.

In certain aspects, when none of the one or more DCIs (e.g., at least the non-fallback DCI) may include the at least one bit to indicate that any multiplexing may be enabled, the UE may stop the whole procedure (e.g., of processing the one or more first PUSCHs) and move to processing of the one or more second PUSCHs scheduled by the fallback DCI.

In certain aspects, the non-fallback DCI may indicate that the at least one first PUSCH (e.g., of the one or more first PUSCHs) may be scheduled in a first slot. In such cases (e.g., based on the slot-based multiplexing), the UE may multiplex each UCI scheduled in the first slot on the at least one first PUSCH (e.g., of the one or more first PUSCHs). In some cases, the UE may multiplex some of the UCIs scheduled in the first slot on the at least one first PUSCH (e.g., of the one or more first PUSCHs). The UE may then transmit the at least one first PUSCH to the gNB.

In certain aspects, the non-fallback DCI may indicate that the at least one first PUSCH (e.g., of the one or more first PUSCHs) may be scheduled in a second slot. In such cases (e.g., based on the PUSCH boundary-based multiplexing), the UE may multiplex each UCI scheduled in the second slot that is overlapping with the at least one first PUSCH (e.g., of the one or more first PUSCHs) in a time domain on the at least one first PUSCH (e.g., of the one or more first PUSCHs). The UE may then transmit the at least one first PUSCH to the gNB.

As indicated at 1130, the UE may process the one or more second PUSCHs scheduled by the fallback DCI (e.g., after the processing of the one or more first PUSCHs scheduled by the nonfallback DCI). For example, based on the processing, the UE may transmit the one or more second PUSCHs to the gNB.

In some cases (e.g., when multiplexing of at least one UCI with the one or more second PUSCHs is enabled), the UE may multiplex the at least one UCI on at least one second PUSCH (e.g., of the one or more second PUSCHs) and then transmit the at least one second PUSCH to the gNB.

In certain aspects, during the processing of the one or more second PUSCHs, the UE may apply one or more rules (e.g., default behaviors) that may be defined for a physical uplink control channel (PUCCH) overlap with the at least one second PUSCH (e.g., of the one or more second PUSCHs) scheduled by the fallback DCI. The one or more rules may include a first rule, a second rule, and a third rule.

In certain aspects, the UE may apply the first rule, which may indicate the UE to (always) drop a PUCCH (e.g., for transmission) that may overlap with the at least one second PUSCH (e.g., of the one or more second PUSCHs) scheduled by the fallback DCI. For example, when the fallback DCI may indicate that the at least one second PUSCH (e.g., of the one or more second PUSCHs) may be scheduled in a first slot, the UE (e.g., based on the first rule) may drop each UCI (e.g., for transmission) scheduled in the first slot that may be overlapping with the at least one second PUSCH (e.g., of the one or more second PUSCHs) in a time domain.

In certain aspects, the UE may apply the second rule, which may indicate the UE to (always) multiplex the PUCCH overlapping on at least one second PUSCH (e.g., of the one or more second PUSCHs) that may be scheduled by the fallback DCI. That is, for each second PUSCH scheduled by the fallback DCI, the UE may check which one or more PUCCHs are overlapping with the second PUSCH, and then multiplex those overlapping PUCCHs on the second PUSCH. For example, when the fallback DCI may indicate that the at least one second PUSCH (e.g., of the one or more second PUSCHs) may be scheduled in a first slot, the UE may multiplex each UCI scheduled in the first slot which may be overlapping with the at least one second PUSCH (e.g., of the one or more second PUSCHs) in a time domain and then transmit the at least one second PUSCH (e.g., of the one or more second PUSCHs) to the gNB.

In certain aspects, when one PUCCH may overlap with multiple second PUSCHs scheduled by the fallback DCI, the PUCCH may be repeatedly multiplexed on all the second PUSCHs. For example, when the fallback DCI may indicate that the multiple second PUSCHs are scheduled in a first slot and UCI scheduled in the first slot may overlap with the multiple second PUSCHs in a time domain, the UE may multiplex the UCI with each of the multiple second PUSCHs and then transmit the multiple second PUSCHs to the gNB.

In certain aspects, the UE may apply the third rule, which may indicate the UE to selectively multiplex only PUCCHs (e.g., with a priority more than or equal to a transmission priority threshold value (e.g., such as threshold S)) on overlapping second PUSCHs scheduled by the fallback DCI. The third rule may also indicate the UE to drop one or more PUCCHs (e.g., with a priority which may be less than the threshold S) that may be overlapping with the one or more second PUSCH scheduled by the fallback DCI.

For example, the UE may receive an indication of the transmission priority threshold value from the gNB. The UE may then determine a first quantity of UCIs that may be scheduled with a priority value that is higher than or equal to the transmission priority threshold value. The UE may also determine a second quantity of UCIs that may be scheduled with the priority value that is less than the transmission priority threshold value. When the fallback DCI may indicate that the at least one second PUSCH (e.g., of the one or more second PUSCHs) may be scheduled in a first slot, the UE (e.g., based on the third rule) may multiplex each UCI (e.g., of the first quantity of UCIs) scheduled in the first slot that may be overlapping with the at least one second PUSCH (e.g., of the one or more second PUSCHs) in a time domain and then transmit the at least one second PUSCH (e.g., of the one or more second PUSCHs) to the gNB. The UE may also drop each UCI (e.g., of the second quantity of UCIs) scheduled in the first slot that may be overlapping with the at least one second PUSCH (e.g., of the one or more second PUSCHs) in the time domain.

In certain aspects, the UE may perform a check (e.g., a final check) to determine if there is still any overlap of a PUCCH with a (scheduled) PUSCH (e.g., on a primary component carrier (PCC)). The UE may determine to drop the PUCCH (e.g., for transmission) when there is any overlap of the PUCCH with the PUSCH. For example, the UE may determine whether there is an overlap between scheduling of UCI and the scheduled PUSCHs (such as the one or more first PUSCHs or the one or more second PUSCHs). The UE may drop the UCI (e.g., for transmission) that may overlap with the one or more first PUSCHs or the one or more second PUSCHs.

Figure 12:
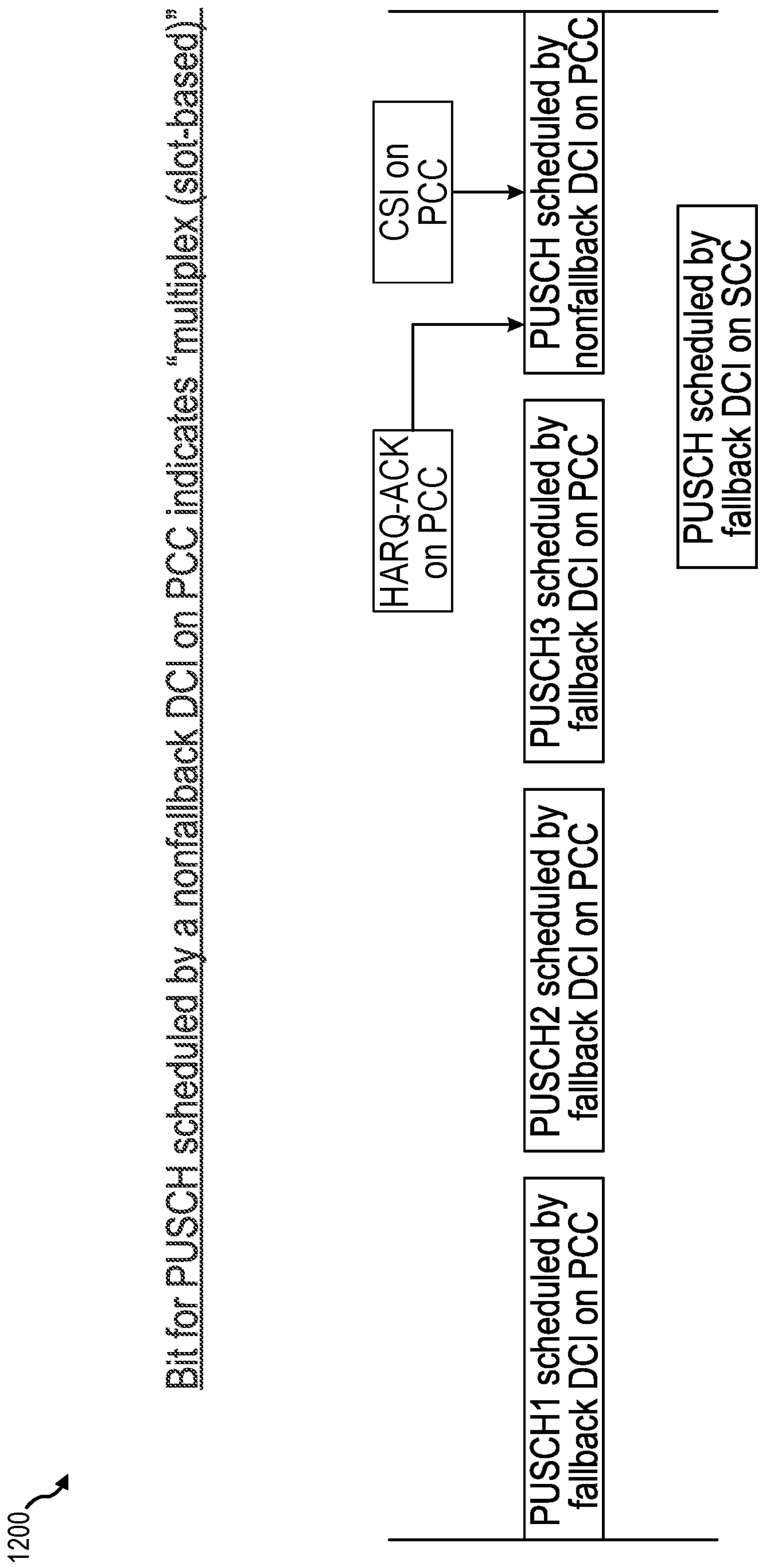
FIG. 12 depicts example slot-based multiplexing being enabled based on a bit in a non-fallback downlink control information (DCI).

FIG. 12 depicts example slot-based multiplexing being enabled based on a bit in a non-fallback DCI. As illustrated in a diagram 1200 of FIG. 12, multiple PUSCHs (e.g., PUSCH 1, PUSCH 2, PUSCH 3) are scheduled by a fallback DCI (e.g., on a PCC), a single PUSCH is scheduled by the fallback DCI (e.g., on a secondary component carrier (SCC)), and a single PUSCH is scheduled by the non-fallback DCI (e.g., on the PCC) in a same slot. The non-fallback DCI includes the bit to indicate that the slot-based multiplexing is enabled. A UE may then process/multiplex each UCI (e.g., HARQ-ACK on the PCC, CSI on the PCC) scheduled in the same slot on the single PUSCH (e.g., which is scheduled by the non-fallback DCI in the same slot). The UE may later process/transmit the multiple PUSCHs scheduled by the fallback DCI.

Figure 13:
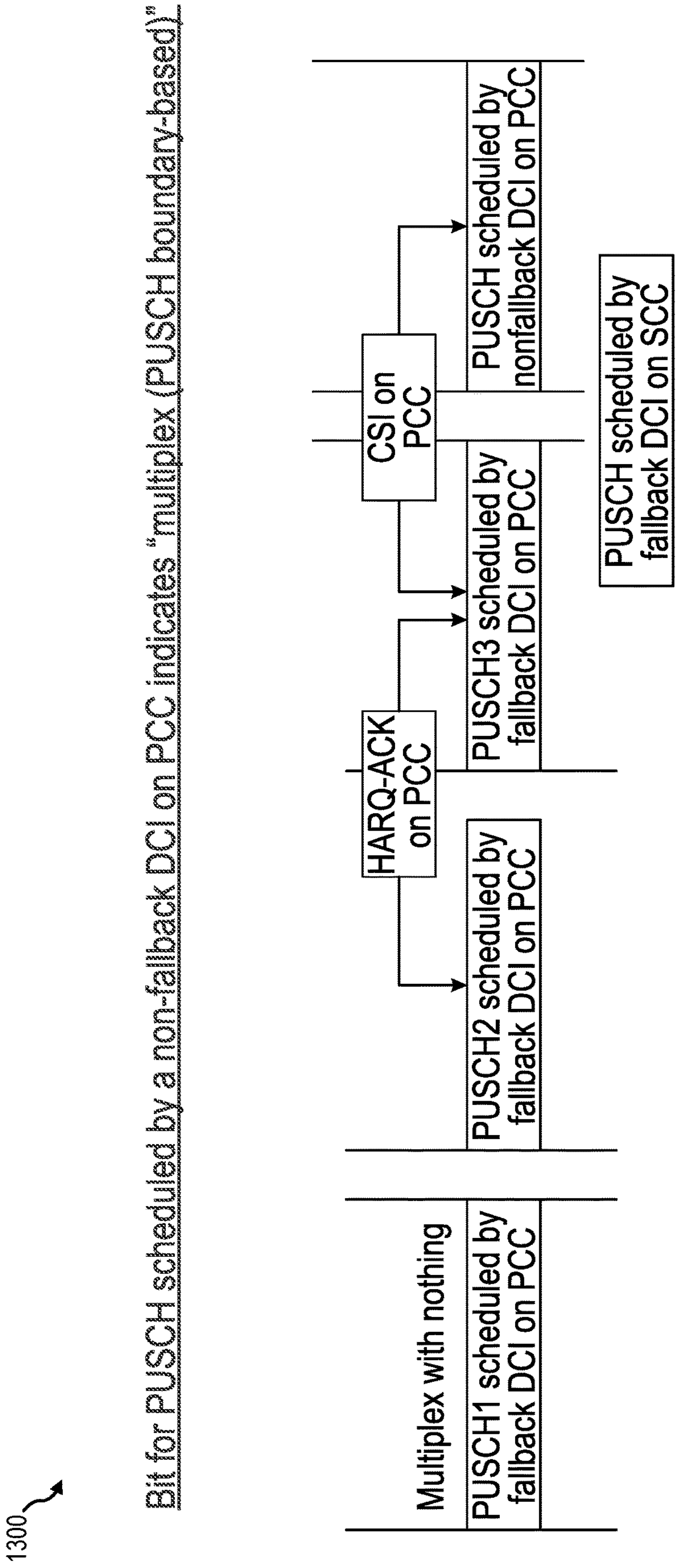
FIG. 13 depicts example PUSCH boundary-based multiplexing being enabled based on a bit in a non-fallback DCI.

FIG. 13 depicts example PUSCH boundary-based multiplexing being enabled based on a bit in a non-fallback DCI. As illustrated in a diagram 1300 of FIG. 13, multiple PUSCHs (e.g., PUSCH 1, PUSCH 2, PUSCH 3) are scheduled by a fallback DCI (e.g., on a PCC), a single PUSCH is scheduled by the fallback DCI (e.g., on a SCC), and a single PUSCH is scheduled by the non-fallback DCI (e.g., on the PCC). The non-fallback DCI includes the bit to indicate that the PUSCH boundary-based multiplexing is enabled. A UE may then process/multiplex UCI (e.g., CSI on the PCC) on the single PUSCH (e.g., which is scheduled by the non-fallback DCI), as the CSI may overlap on the single PUSCH. The UE may later process/transmit the multiple PUSCHs scheduled by the fallback DCI, the HARQ-ACK, etc.

Figure 14:
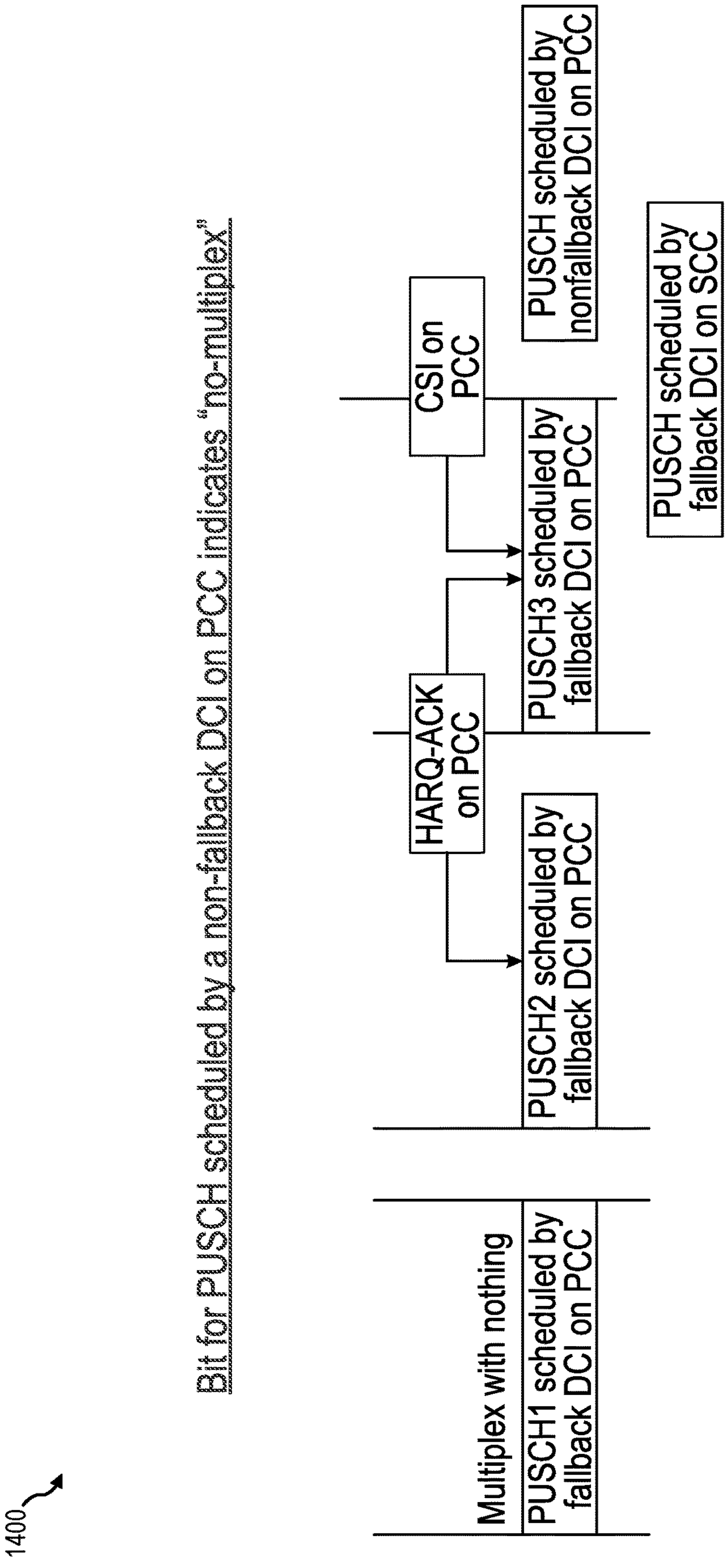
FIG. 14 depicts no multiplexing of UCI on a PUSCH based on a bit in a non-fallback DCI.

FIG. 14 depicts no multiplexing of UCI on a PUSCH based on a bit in a non-fallback DCI. As illustrated in a diagram 1400 of FIG. 14, multiple PUSCHs (e.g., PUSCH 1, PUSCH 2, PUSCH 3) are scheduled by a fallback DCI (e.g., on a PCC), a single PUSCH is scheduled by the fallback DCI (e.g., on a SCC), and a single PUSCH is scheduled by the non-fallback DCI (e.g., on the PCC). The non-fallback DCI includes the bit to indicate that no multiplexing is enabled. In this case, the UE may multiplex PUCCHs on overlapping PUSCHs scheduled by the fallback DCI. For example, the UE may multiplex HARQ-ACK (e.g., on the PCC) on the PUSCH 2, multiplex HARQ-ACK (e.g., on the PCC) on the PUSCH 3, and multiplex CSI (e.g., on the PCC) on the PUSCH 3. The UE may then process other PUSCHs.

Figure 15:
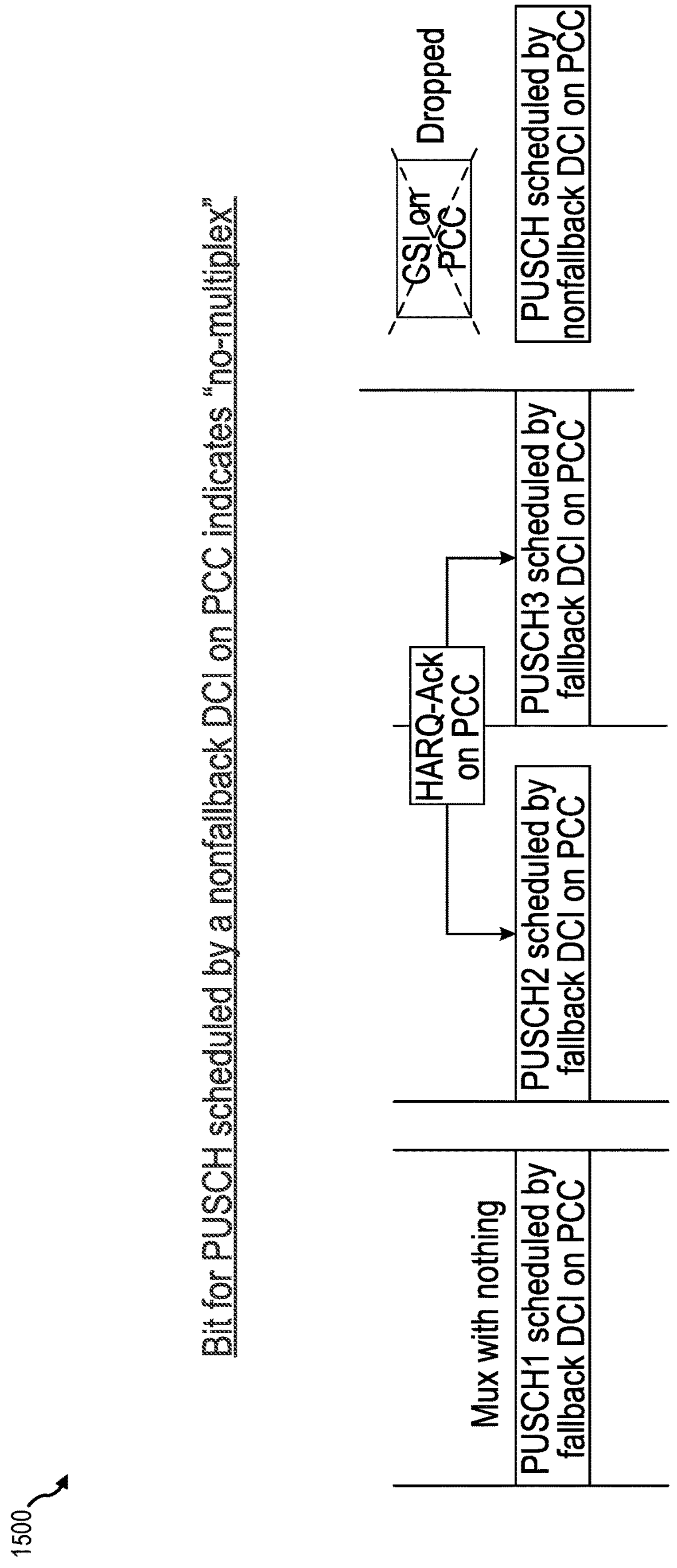
FIG. 15 depicts no multiplexing of UCI on a PUSCH based on a bit in a non-fallback DCI and dropping of UCI overlapping with the non-fallback DCI.

FIG. 15 depicts no multiplexing of UCI on a PUSCH based on a bit in a non-fallback DCI and dropping of UCI. As illustrated in a diagram 1500 of FIG. 15, multiple PUSCHs (e.g., PUSCH 1, PUSCH 2, PUSCH 3) are scheduled by a fallback DCI (e.g., on a PCC) and a single PUSCH is scheduled by the non-fallback DCI (e.g., on the PCC). The non-fallback DCI includes the bit to indicate that no multiplexing is enabled. In this case, the UE may multiplex HARQ-ACK (e.g., on the PCC) on the PUSCH 2 and multiplex HARQ-ACK (e.g., on the PCC) on the PUSCH 3. The UE may drop CSI (e.g., on the PCC), since there is an overlap between the CSI and the single PUSCH scheduled by the non-fallback DCI, and the non-fallback DCI indicates no multiplexing.

Example Method for Wireless Communications at a User Equipment (UE)

FIG. 16 shows an example of a method 1600 for wireless communications at a user equipment (UE), such as the UE 104 of FIG. 1 and FIG. 3.

Method 1600 begins at step 1610 with receiving at least one of a first downlink control information (DCI) of a first type scheduling one or more first physical uplink shared channels (PUSCHs) or a second DCI of a second type scheduling one or more second PUSCHs. In some cases, the operations of this step refer to, or may be performed by, circuitry for receiving and/or code for receiving as described with reference to FIG. 18.

Method 1600 then proceeds to step 1620 with processing at least one of the one or more first PUSCHs scheduled by the first DCI or the one or more second PUSCHs scheduled by the second DCI, where the processing of the one or more first PUSCHs includes multiplexing at least one uplink control information (UCI) on a PUSCH of the one or more first PUSCHs and transmitting the PUSCH of the one or more first PUSCHs. In some cases, the operations of this step refer to, or may be performed by, circuitry for processing and/or code for processing as described with reference to FIG. 18.

In certain aspects, the receiving includes receiving the first DCI of the first type and the second DCI of the second type; and the processing includes processing the one or more first PUSCHs scheduled by the first DCI prior to the one or more second PUSCHs scheduled by the second DCI.

In certain aspects, the first DCI includes a bit to indicate that multiplexing of the at least one UCI with the one or more first PUSCHs is enabled.

In certain aspects, the first DCI indicates that the PUSCH of the one or more first PUSCHs is scheduled in a first slot; and the multiplexing includes multiplexing each UCI scheduled in the first slot on the PUSCH of the one or more first PUSCHs.

In certain aspects, the first DCI indicates that the PUSCH of the one or more first PUSCHs is scheduled in a first slot; and the multiplexing includes multiplexing each UCI scheduled in the first slot that is overlapping with the PUSCH of the one or more first PUSCHs in a time domain on the PUSCH of the one or more first PUSCHs.

In certain aspects, the method 1600 further includes processing the one or more second PUSCHs scheduled by the second DCI subsequent to the processing of the one or more first PUSCHs scheduled by the first DCI.

In certain aspects, the second DCI indicates that a PUSCH of the one or more second PUSCHs is scheduled in a first slot; and the processing of the one or more second PUSCHs includes dropping each UCI scheduled in the first slot that is overlapping with the PUSCH of the one or more second PUSCHs in a time domain.

In certain aspects, the second DCI indicates that a PUSCH of the one or more second PUSCHs is scheduled in a first slot; and the processing of the one or more second PUSCHs includes: multiplexing each UCI scheduled in the first slot that is overlapping with the PUSCH of the one or more second PUSCHs in a time domain; and transmitting the PUSCH of the one or more second PUSCHs.

In certain aspects, the second DCI indicates that multiple second PUSCHs are scheduled in a first slot; UCI scheduled in the first slot overlaps with the multiple second PUSCHs in a time domain; and the processing of the one or more second PUSCHs includes: multiplexing the UCI with each of the multiple second PUSCHs; and transmitting the multiple second PUSCHs.

In certain aspects, the method 1600 further includes receiving a transmission priority threshold value from a network entity; and determining a first quantity of UCIs that are scheduled with a priority value that is higher than or equal to the transmission priority threshold value and a second quantity of UCIs that are scheduled with the priority value that is less than the transmission priority threshold value.

In certain aspects, the second DCI indicates that a PUSCH of the one or more second PUSCHs is scheduled in a first slot; and the processing of the one or more second PUSCHs includes: multiplexing each UCI of the first quantity of UCIs scheduled in the first slot that is overlapping with the PUSCH of the one or more second PUSCHs in a time domain; and transmitting the PUSCH of the one or more second PUSCHs.

In certain aspects, the processing of the one or more second PUSCHs includes dropping each UCI of the second quantity of UCIs scheduled in the first slot that is overlapping with the PUSCH of the one or more second PUSCHs in the time domain.

In certain aspects, the method 1600 further includes determining whether there is an overlap between scheduling of UCI and the one or more first PUSCHs or the one or more second PUSCHs; and dropping the UCI overlapping with the one or more first PUSCHs or the one or more second PUSCHs.

In certain aspects, the first type includes a non-fallback DCI format and the second type comprises a fallback DCI format.

Figure 18:
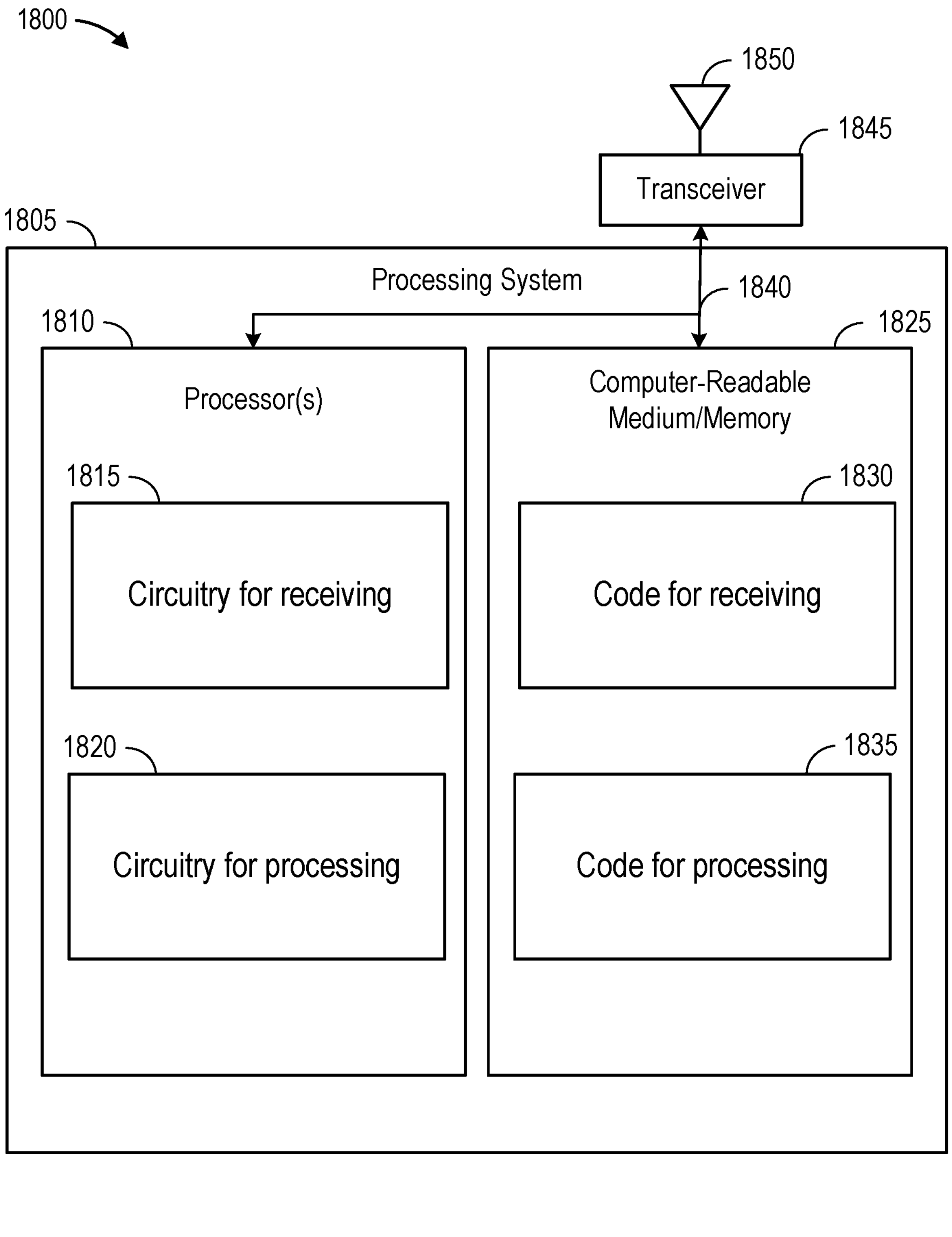
FIG. 18 and FIG. 19 depict example communications devices.

In one aspect, the method 1600, or any aspect related to it, may be performed by an apparatus, such as a communications device 1800 of FIG. 18, which includes various components operable, configured, or adapted to perform the method 1600. The communications device 1800 is described below in further detail.

Note that FIG. 16 is just one example of a method, and other methods including fewer, additional, or alternative steps are possible consistent with this disclosure.

Example Method for Wireless Communications at a Network Entity

Figure 17:
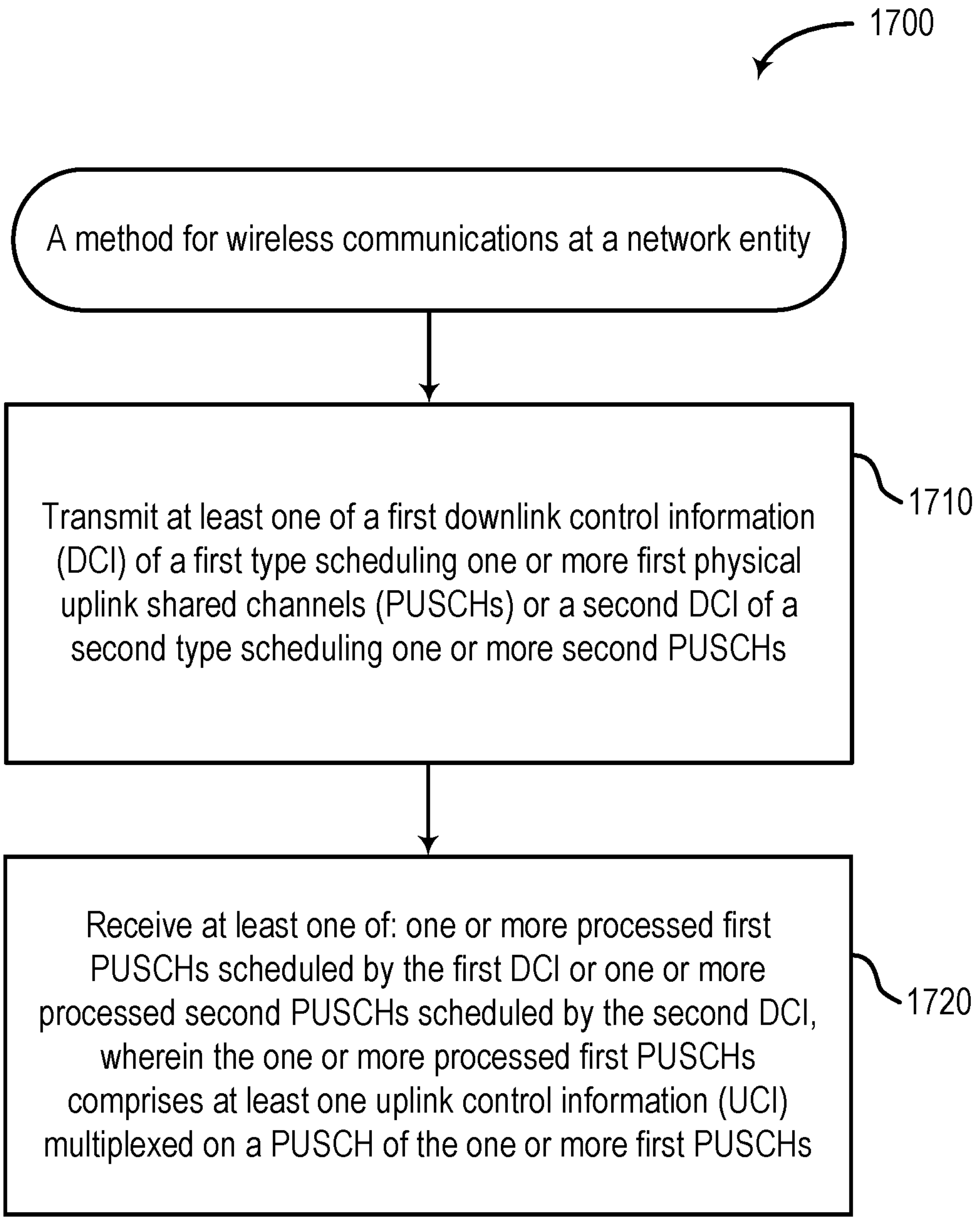
FIG. 17 depicts a method for wireless communications at a network entity.

FIG. 17 shows an example of a method 1700 for wireless communications at a network entity, such as the BS 102 of FIG. 1 and FIG. 3.

Method 1700 begins at step 1710 with transmitting at least one of a first downlink control information (DCI) of a first type scheduling one or more first physical uplink shared channels (PUSCHs) or a second DCI of a second type scheduling one or more second PUSCHs. In some cases, the operations of this step refer to, or may be performed by, circuitry for transmitting and/or code for transmitting as described with reference to FIG. 19.

Method 1700 then proceeds to step 1720 with receiving at least one of: one or more processed first PUSCHs scheduled by the first DCI or one or more processed second PUSCHs scheduled by the second DCI where the one or more processed first PUSCHs includes at least one uplink control information (UCI) multiplexed on a PUSCH of the one or more first PUSCHs. In some cases, the operations of this step refer to, or may be performed by, circuitry for receiving and/or code for receiving as described with reference to FIG. 19.

In certain aspects, the transmitting includes transmitting the first DCI of the first type and the second DCI of the second type.

In certain aspects, the first DCI includes a bit to indicate that multiplexing of the at least one UCI with the one or more first PUSCHs is enabled.

Figure 19:
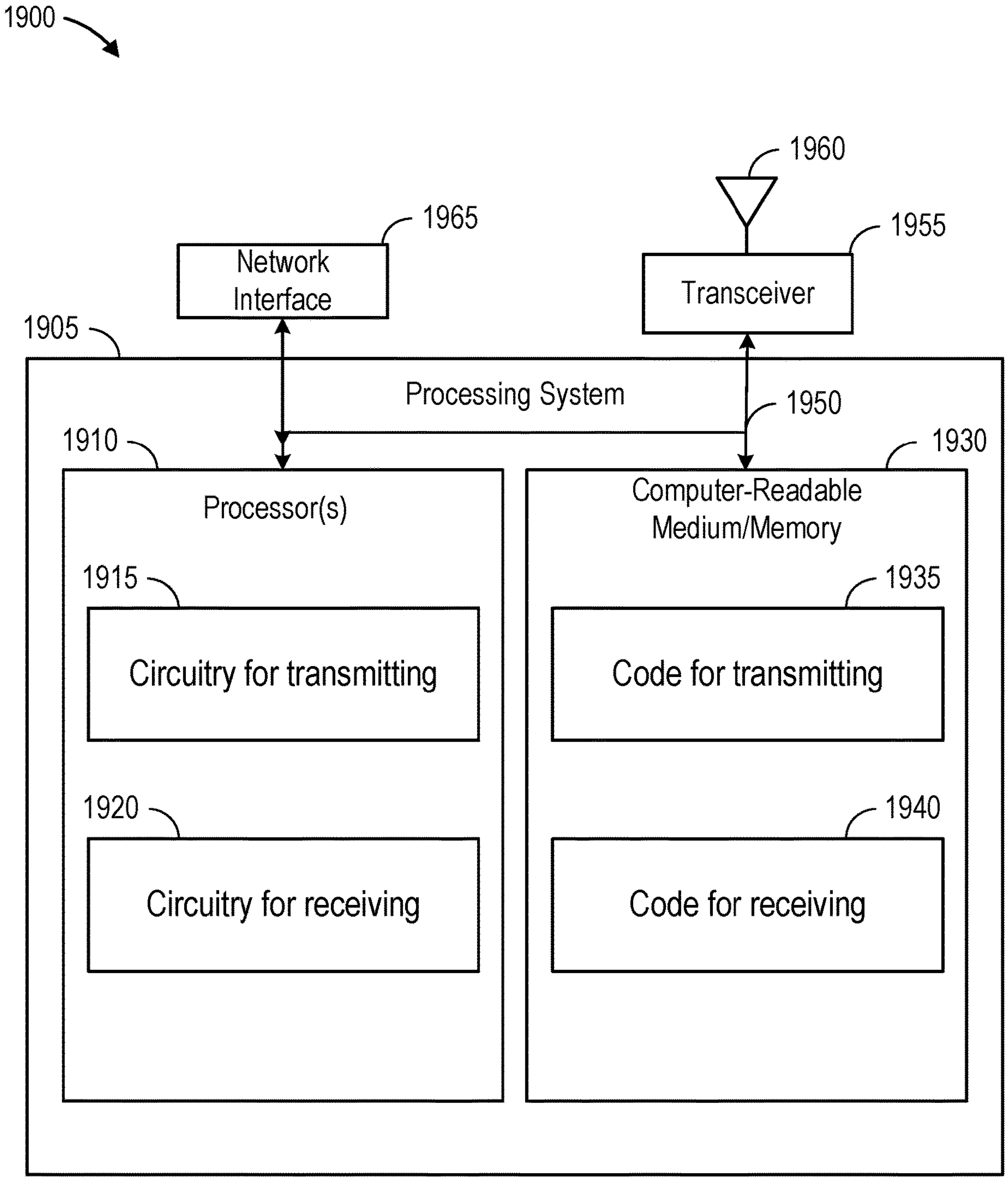

In one aspect, the method 1700, or any aspect related to it, may be performed by an apparatus, such as a communications device 1900 of FIG. 19, which includes various components operable, configured, or adapted to perform the method 1700. The communications device 1900 is described below in further detail.

Note that FIG. 17 is just one example of a method, and other methods including fewer, additional, or alternative steps are possible consistent with this disclosure.

Example Communications Devices

FIG. 18 depicts aspects of an example communications device 1800. In some aspects, communications device 1800 is a user equipment (UE), such as UE 104 described above with respect to FIG. 1 and FIG. 3.

The communications device 1800 includes a processing system 1805 coupled to a transceiver 1845 (e.g., a transmitter and/or a receiver). The transceiver 1845 is configured to transmit and receive signals for the communications device 1800 via an antenna 1850, such as the various signals as described herein. The processing system 1805 may be configured to perform processing functions for the communications device 1800, including processing signals received and/or to be transmitted by the communications device 1800.

The processing system 1805 includes one or more processors 1810. In various aspects, the one or more processors 1810 may be representative of one or more of receive processor 358, transmit processor 364, TX MIMO processor 366, and/or controller/processor 380, as described with respect to FIG. 3. The one or more processors 1810 are coupled to a computer-readable medium/memory 1825 via a bus 1840. In certain aspects, the computer-readable medium/memory 1825 is configured to store instructions (e.g., computer-executable code) that when executed by the one or more processors 1810, cause the one or more processors 1810 to perform the method 1600 described with respect to FIG. 16, and/or any aspect related to it. Note that reference to a processor performing a function of communications device 1800 may include the one or more processors 1810 performing that function of communications device 1800.

In the depicted example, computer-readable medium/memory 1825 stores code (e.g., executable instructions), such as code for receiving 1830 and code for processing 1835. Processing of the code for receiving 1830 and the code for processing 1835 may cause the communications device 1800 to perform the method 1600 described with respect to FIG. 16, and/or any aspect related to it.

The one or more processors 1810 include circuitry configured to implement (e.g., execute) the code stored in the computer-readable medium/memory 1825, including circuitry such as circuitry for receiving 1815 and circuitry for processing 1820. Processing with the circuitry for receiving 1815 and the circuitry for processing 1820 may cause the communications device 1800 to perform the method 1600 described with respect to FIG. 16, and/or any aspect related to it.

Various components of the communications device 1800 may provide means for performing the method 1600 described with respect to FIG. 16, and/or any aspect related to it. For example, means for transmitting, sending or outputting for transmission may include transceivers 354 and/or antenna(s) 352 of the UE 104 illustrated in FIG. 3 and/or the transceiver 1845 and the antenna 1850 of the communications device 1800 in FIG. 18. Means for receiving or obtaining may include transceivers 354 and/or antenna(s) 352 of the UE 104 illustrated in FIG. 3 and/or the code for receiving 1830, the circuitry for receiving 1815, the transceiver 1845 and the antenna 1850 of the communications device 1800 in FIG. 18. Means for processing may include processors, transceivers 354 and/or antenna(s) 352 of the UE 104 illustrated in FIG. 3 and/or the code for processing 1835, the circuitry for processing 1820, the transceiver 1845 and the antenna 1850 of the communications device 1800 in FIG. 18.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 18 is an example, and many other examples and configurations of communication device 1800 are possible.

FIG. 19 depicts aspects of an example communications device 1900. In some aspects, communications device 1900 is a network entity, such as BS 102 of FIG. 1 and FIG. 3, or a disaggregated base station as discussed with respect to FIG. 2.

The communications device 1900 includes a processing system 1905 coupled to a transceiver 1955 (e.g., a transmitter and/or a receiver) and/or a network interface 1965. The transceiver 1955 is configured to transmit and receive signals for the communications device 1900 via an antenna 1960, such as the various signals as described herein. The network interface 1965 is configured to obtain and send signals for the communications device 1900 via communication link(s), such as a backhaul link, midhaul link, and/or fronthaul link as described herein, such as with respect to FIG. 2. The processing system 1905 may be configured to perform processing functions for the communications device 1900, including processing signals received and/or to be transmitted by the communications device 1900.

The processing system 1905 includes one or more processors 1910. In various aspects, one or more processors 1410 may be representative of one or more of receive processor 338, transmit processor 320, TX MIMO processor 330, and/or controller/processor 340, as described with respect to FIG. 3. The one or more processors 1910 are coupled to a computer-readable medium/memory 1930 via a bus 1950. In certain aspects, the computer-readable medium/memory 1930 is configured to store instructions (e.g., computer-executable code) that when executed by the one or more processors 1910, cause the one or more processors 1910 to perform the method 1700 described with respect to FIG. 17, or any aspect related to it. Note that reference to a processor of communications device 1900 performing a function may include the one or more processors 1910 of communications device 1900 performing that function.

In the depicted example, the computer-readable medium/memory 1930 stores code (e.g., executable instructions), such as code for transmitting 1935 and code for receiving 1940. Processing of the code for transmitting 1935 and the code for receiving 1940 may cause the communications device 1900 to perform the method 1700 described with respect to FIG. 17, or any aspect related to it.

The one or more processors 1910 include circuitry configured to implement (e.g., execute) the code stored in the computer-readable medium/memory 1930, including circuitry such as circuitry for transmitting 1915 and circuitry for receiving 1920. Processing with the circuitry for transmitting 1915 and the circuitry for receiving 1920 may cause the communications device 1900 to perform the method 1700 described with respect to FIG. 17, or any aspect related to it.

Various components of the communications device 1900 may provide means for performing the method 1700 described with respect to FIG. 17, or any aspect related to it. Means for transmitting, sending or outputting for transmission may include transceivers 332 and/or antenna(s) 334 of the BS 102 illustrated in FIG. 3 and/or the circuitry for transmitting 1915, the code for transmitting 1935, the transceiver 1955 and the antenna 1960 of the communications device 1900 in FIG. 19. Means for receiving or obtaining may include transceivers 332 and/or antenna(s) 334 of the BS 102 illustrated in FIG. 3 and/or the circuitry for receiving 1920, the code for receiving 1940, the transceiver 1955 and the antenna 1960 of the communications device 1900 in FIG. 19.

In some cases, rather than actually transmitting, for example, signals and/or data, a device may have an interface to output signals and/or data for transmission (a means for outputting). For example, a processor may output signals and/or data, via a bus interface, to an RF front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 19 is an example, and many other examples and configurations of communication device 1900 are possible.

Example Clauses

Implementation examples are described in the following numbered clauses:

Clause 1: A method for wireless communications at a user equipment (UE), comprising: receiving at least one of a first downlink control information (DCI) of a first type scheduling one or more first physical uplink shared channels (PUSCHs) or a second DCI of a second type scheduling one or more second PUSCHs; and processing at least one of the one or more first PUSCHs scheduled by the first DCI or the one or more second PUSCHs scheduled by the second DCI, wherein the processing of the one or more first PUSCHs comprises multiplexing at least one uplink control information (UCI) on a PUSCH of the one or more first PUSCHs and transmitting the PUSCH of the one or more first PUSCHs.

Clause 2: The method of clause 1, wherein: the receiving comprises receiving the first DCI of the first type and the second DCI of the second type; and the processing comprises processing the one or more first PUSCHs scheduled by the first DCI prior to the one or more second PUSCHs scheduled by the second DCI.

Clause 3: The method of any one of clauses 1-2, wherein the first DCI comprises a bit to indicate that multiplexing of the at least one UCI with the one or more first PUSCHs is enabled.

Clause 4: The method of any one of clauses 1-3, wherein: the first DCI indicates that the PUSCH of the one or more first PUSCHs is scheduled in a first slot; and the multiplexing comprises multiplexing each UCI scheduled in the first slot on the PUSCH of the one or more first PUSCHs.

Clause 5: The method of any one of clauses 1-4, wherein: the first DCI indicates that the PUSCH of the one or more first PUSCHs is scheduled in a first slot; and the multiplexing comprises multiplexing each UCI scheduled in the first slot that is overlapping with the PUSCH of the one or more first PUSCHs in a time domain on the PUSCH of the one or more first PUSCHs.

Clause 6: The method of any one of clauses 1-5, further comprising processing the one or more second PUSCHs scheduled by the second DCI subsequent to the processing of the one or more first PUSCHs scheduled by the first DCI.

Clause 7: The method of clause 6, wherein: the second DCI indicates that a PUSCH of the one or more second PUSCHs is scheduled in a first slot; and the processing of the one or more second PUSCHs comprises dropping each uplink control information (UCI) scheduled in the first slot that is overlapping with the PUSCH of the one or more second PUSCHs in a time domain.

Clause 8: The method of clause 6, wherein: the second DCI indicates that a PUSCH of the one or more second PUSCHs is scheduled in a first slot; and the processing of the one or more second PUSCHs comprises: multiplexing each uplink control information (UCI) scheduled in the first slot that is overlapping with the PUSCH of the one or more second PUSCHs in a time domain; and transmitting the PUSCH of the one or more second PUSCHs.

Clause 9: The method of clause 6, wherein: the second DCI indicates that multiple second PUSCHs are scheduled in a first slot; an uplink control information (UCI) scheduled in the first slot overlaps with the multiple second PUSCHs in a time domain; and the processing of the one or more second PUSCHs comprises: multiplexing the UCI with each of the multiple second PUSCHs; and transmitting the multiple second PUSCHs.

Clause 10: The method of clause 6, further comprising: receiving a transmission priority threshold value from a network entity; and determining a first quantity of uplink control informations (UCIs) that are scheduled with a priority value that is higher than or equal to the transmission priority threshold value and a second quantity of UCIs that are scheduled with the priority value that is less than the transmission priority threshold value.

Clause 11: The method of clause 10, wherein: the second DCI indicates that a PUSCH of the one or more second PUSCHs is scheduled in a first slot; and the processing of the one or more second PUSCHs comprises: multiplexing each UCI of the first quantity of UCIs scheduled in the first slot that is overlapping with the PUSCH of the one or more second PUSCHs in a time domain; and transmitting the PUSCH of the one or more second PUSCHs.

Clause 12: The method of clause 11, wherein the processing of the one or more second PUSCHs comprises dropping each UCI of the second quantity of UCIs scheduled in the first slot that is overlapping with the PUSCH of the one or more second PUSCHs in the time domain.

Clause 13: The method of any one of clauses 1-12, further comprising: determining whether there is an overlap between scheduling of an uplink control information (UCI) and the one or more first PUSCHs or the one or more second PUSCHs; and dropping the UCI overlapping with the one or more first PUSCHs or the one or more second PUSCHs.

Clause 14: The method of any one of clauses 1-13, wherein the first type comprises a non-fallback DCI format and the second type comprises a fallback DCI format.

Clause 15: A method for wireless communications at a network entity, comprising: transmitting at least one of a first downlink control information (DCI) of a first type scheduling one or more first physical uplink shared channels (PUSCHs) or a second DCI of a second type scheduling one or more second PUSCHs; and receiving at least one of: one or more processed first PUSCHs scheduled by the first DCI or one or more processed second PUSCHs scheduled by the second DCI, wherein the one or more processed first PUSCHs comprises at least one uplink control information (UCI) multiplexed on a PUSCH of the one or more first PUSCHs.

Clause 16: The method of clause 15, wherein the transmitting comprises transmitting the first DCI of the first type and the second DCI of the second type.

Clause 17: The method of any one of clauses 15-16, wherein the first DCI comprises a bit to indicate that multiplexing of the at least one UCI with the one or more first PUSCHs is enabled.

Clause 18: An apparatus, comprising: a memory comprising executable instructions; and one or more processors configured, individually or in any combination, to execute the executable instructions and cause the apparatus to perform a method in accordance with any one of Clauses 1-17.

Clause 19: An apparatus, comprising means for performing a method in accordance with any one of Clauses 1-17.

Clause 20: A non-transitory computer-readable medium comprising executable instructions that, when executed by one or more processors of an apparatus, cause the apparatus to perform a method in accordance with any one of Clauses 1-17.

Clause 21: A computer program product embodied on a computer-readable storage medium comprising code for performing a method in accordance with any one of Clauses 1-17.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications at a user equipment (UE), comprising:
- a memory comprising instructions;
- one or more processors, individually or collectively, configured to execute the instructions and cause the UE to:
  - receive a first downlink control information (DCI) of a first type scheduling one or more first physical uplink shared channels (PUSCHs) and a second DCI of a second type scheduling one or more second PUSCHs; and
  - process the one or more first PUSCHs scheduled by the first DCI and the one or more second PUSCHs scheduled by the second DCI, wherein the process of the one or more first PUSCHs comprises multiplex at least one uplink control information (UCI) on a PUSCH of the one or more first PUSCHs and transmitting the PUSCH of the one or more first PUSCHs, and wherein the one or more first PUSCHs scheduled by the first DCI are processed prior to the one or more second PUSCHs scheduled by the second DCI.

2. The apparatus of claim 1, wherein the first DCI comprises a bit to indicate that multiplexing of the at least one UCI with the one or more first PUSCHs is enabled.

3. The apparatus of claim 1, wherein:
- the first DCI indicates that the PUSCH of the one or more first PUSCHs is scheduled in a first slot; and the multiplex comprises multiplex each UCI scheduled in the first slot on the PUSCH of the one or more first PUSCHs.

4. The apparatus of claim 1, wherein:

the first DCI indicates that the PUSCH of the one or more first PUSCHs is scheduled in a first slot; and the multiplex comprises multiplex each UCI scheduled in the first slot that is overlapping with the PUSCH of the one or more first PUSCHs in a time domain on the PUSCH of the one or more first PUSCHs.

5. The apparatus of claim 1, wherein the one or more processors, individually or collectively, are configured to execute the instructions and cause the UE to process the one or more second PUSCHs scheduled by the second DCI subsequent to the processing of the one or more first PUSCHs scheduled by the first DCI.

6. The apparatus of claim 5, wherein:

the second DCI indicates that a PUSCH of the one or more second PUSCHs is scheduled in a first slot; and the one or more processors, individually or collectively, are configured to execute the instructions and cause the UE to drop each uplink control information (UCI) scheduled in the first slot that is overlapping with the PUSCH of the one or more second PUSCHs in a time domain.

7. The apparatus of claim 5, wherein:

the second DCI indicates that a PUSCH of the one or more second PUSCHs is scheduled in a first slot; and the one or more processors, individually or collectively, are configured to execute the instructions and cause the UE to:

multiplex each uplink control information (UCI) scheduled in the first slot that is overlapping with the PUSCH of the one or more second PUSCHs in a time domain; and transmit the PUSCH of the one or more second PUSCHs.

8. The apparatus of claim 5, wherein:

the second DCI indicates that multiple second PUSCHs are scheduled in a first slot;

an uplink control information (UCI) scheduled in the first slot overlaps with the multiple second PUSCHs in a time domain; and the one or more processors, individually or collectively, are configured to execute the instructions and cause the UE to:

multiplex the UCI with each of the multiple second PUSCHs; and transmit the multiple second PUSCHs.

9. The apparatus of claim 5, wherein the one or more processors, individually or collectively, are configured to execute the instructions and cause the UE to:

receive a transmission priority threshold value from a network entity; and determine a first quantity of uplink control informations (UCIs) that are scheduled with a priority value that is higher than or equal to the transmission priority threshold value and a second quantity of UCIs that are scheduled with the priority value that is less than the transmission priority threshold value.

10. The apparatus of claim 9, wherein:

the second DCI indicates that a PUSCH of the one or more second PUSCHs is scheduled in a first slot; and the one or more processors, individually or collectively, are configured to execute the instructions and cause the UE to:

multiplex each UCI of the first quantity of UCIs scheduled in the first slot that is overlapping with the PUSCH of the one or more second PUSCHs in a time domain; and transmit the PUSCH of the one or more second PUSCHs.

11. The apparatus of claim 10, wherein the one or more processors, individually or collectively, are configured to execute the instructions and cause the UE to drop each UCI of the second quantity of UCIs scheduled in the first slot that is overlapping with the PUSCH of the one or more second PUSCHs in the time domain.

12. The apparatus of claim 1, wherein the one or more processors, individually or collectively, are configured to execute the instructions and cause the UE to:

determine whether there is an overlap between scheduling of an uplink control information (UCI) and the one or more first PUSCHs or the one or more second PUSCHs; and drop the UCI overlapping with the one or more first PUSCHs or the one or more second PUSCHs.

13. The apparatus of claim 1, wherein the first type comprises a non-fallback DCI format and the second type comprises a fallback DCI format.

14. An apparatus for wireless communications at a network entity, comprising:

a memory comprising instructions;

one or more processors, individually or collectively, configured to execute the instructions and cause the network entity to:

transmit a first downlink control information (DCI) of a first type scheduling one or more first physical uplink shared channels (PUSCHs) and or a second DCI of a second type scheduling one or more second PUSCHs; and receive one or more processed first PUSCHs scheduled by the first DCI and one or more processed second PUSCHs scheduled by the second DCI, wherein the one or more processed first PUSCHs comprises at least one uplink control information (UCI) multiplexed on a PUSCH of the one or more first PUSCHs, and wherein the one or more first PUSCHs scheduled by the first DCI are processed prior to the one or more second PUSCHs scheduled by the second DCI.

15. The apparatus of claim 14, wherein the first DCI comprises a bit to indicate that multiplexing of the at least one UCI with the one or more first PUSCHs is enabled.

16. A method for wireless communications at a user equipment (UE), comprising:

receiving a first downlink control information (DCI) of a first type scheduling one or more first physical uplink shared channels (PUSCHs) and a second DCI of a second type scheduling one or more second PUSCHs; and processing the one or more first PUSCHs scheduled by the first DCI and of the one or more second PUSCHs scheduled by the second DCI, wherein the processing of the one or more first PUSCHs comprises multiplexing at least one uplink control information (UCI) on a PUSCH of the one or more first PUSCHs and transmitting the PUSCH of the one or more first PUSCHs, and wherein the one or more first PUSCHs scheduled by the first DCI are processed prior to the one or more second PUSCHs scheduled by the second DCI.

17. The method of claim 16, wherein the first DCI comprises a bit to indicate that multiplexing of the at least one UCI with the one or more first PUSCHs is enabled.

18. The method of claim 16, wherein:

the first DCI indicates that the PUSCH of the one or more first PUSCHs is scheduled in a first slot; and the multiplexing comprises multiplexing each UCI scheduled in the first slot on the PUSCH of the one or more first PUSCHs.

19. The method of claim 16, wherein:

the first DCI indicates that the PUSCH of the one or more first PUSCHs is scheduled in a first slot; and the multiplexing comprises multiplexing each UCI scheduled in the first slot that is overlapping with the PUSCH of the one or more first PUSCHs in a time domain on the PUSCH of the one or more first PUSCHs.

20. The method of claim 16, further comprising processing the one or more second PUSCHs scheduled by the second DCI subsequent to the processing of the one or more first PUSCHs scheduled by the first DCI.

21. The method of claim 20, wherein:

the second DCI indicates that a PUSCH of the one or more second PUSCHs is scheduled in a first slot; and the processing of the one or more second PUSCHs comprises dropping each uplink control information (UCI) scheduled in the first slot that is overlapping with the PUSCH of the one or more second PUSCHs in a time domain.

22. The method of claim 20, wherein:

the second DCI indicates that a PUSCH of the one or more second PUSCHs is scheduled in a first slot; and the processing of the one or more second PUSCHs comprises:

multiplexing each uplink control information (UCI) scheduled in the first slot that is overlapping with the PUSCH of the one or more second PUSCHs in a time domain; and transmitting the PUSCH of the one or more second PUSCHs.

23. The method of claim 20, wherein:

the second DCI indicates that multiple second PUSCHs are scheduled in a first slot;

an uplink control information (UCI) scheduled in the first slot overlaps with the multiple second PUSCHs in a time domain; and the processing of the one or more second PUSCHs comprises:

multiplexing the UCI with each of the multiple second PUSCHs; and transmitting the multiple second PUSCHs.

24. The method of claim 20, further comprising:

receiving a transmission priority threshold value from a network entity; and determining a first quantity of uplink control informations (UCIs) that are scheduled with a priority value that is higher than or equal to the transmission priority threshold value and a second quantity of UCIs that are scheduled with the priority value that is less than the transmission priority threshold value.

25. A method for wireless communications at a network entity, comprising:

transmitting a first downlink control information (DCI) of a first type scheduling one or more first physical uplink shared channels (PUSCHs) and or a second DCI of a second type scheduling one or more second PUSCHs; and receiving one or more processed first PUSCHs scheduled by the first DCI and one or more processed second PUSCHs scheduled by the second DCI, wherein the one or more processed first PUSCHs comprises at least one uplink control information (UCI) multiplexed on a PUSCH of the one or more first PUSCHs, and wherein the one or more first PUSCHs scheduled by the first DCI are processed prior to the one or more second PUSCHs scheduled by the second DCI.

26. The method of claim 25, wherein the first DCI comprises a bit to indicate that multiplexing of the at least one UCI with the one or more first PUSCHs is enabled.

* * * * *